US010913860B2

United States Patent
Yuasa et al.

(10) Patent No.: US 10,913,860 B2
(45) Date of Patent: Feb. 9, 2021

(54) COATED METAL SHEET FOR AUTOMOBILE EXCELLENT IN RUST RESISTANCE IN LOW TEMPERATURE RUNNING ENVIRONMENTS

(71) Applicants: NIPPON STEEL & SUMITOMO METAL CORPORATION, Tokyo (JP); NIPPON PAINT INDUSTRIAL COATINGS CO., LTD., Tokyo (JP)

(72) Inventors: Kensei Yuasa, Tokyo (JP); Yoichiro Mori, Tokyo (JP); Yusuke Wada, Tokyo (JP); Mitsutaka Nambo, Tokyo (JP)

(73) Assignees: NIPPON STEEL CORPORATION, Tokyo (JP); NIPPON PAINT INDUSTRIAL COATINGS CO., LTD., Tokyo (JP)

( * ) Notice: Subject to any disclaimer, the term of this patent is extended or adjusted under 35 U.S.C. 154(b) by 200 days.

(21) Appl. No.: 15/515,946

(22) PCT Filed: Sep. 30, 2015

(86) PCT No.: PCT/JP2015/077845
§ 371 (c)(1),
(2) Date: Mar. 30, 2017

(87) PCT Pub. No.: WO2016/052661
PCT Pub. Date: Apr. 7, 2016

(65) Prior Publication Data
US 2017/0298231 A1    Oct. 19, 2017

(30) Foreign Application Priority Data
Sep. 30, 2014  (JP) .................. 2014-202174

(51) Int. Cl.
*C09D 5/08* (2006.01)
*C09D 175/04* (2006.01)
(Continued)

(52) U.S. Cl.
CPC ........... *C09D 5/084* (2013.01); *B62D 29/001* (2013.01); *C09D 5/24* (2013.01); *C09D 7/48* (2018.01);
(Continued)

(58) Field of Classification Search
CPC ........... C09D 5/002; C09D 5/24; C09D 5/084
See application file for complete search history.

(56) References Cited

U.S. PATENT DOCUMENTS 5,578,669 A * 11/1996 Odawa ..................... C09D 5/08
106/14.17
2004/0167271 A1* 8/2004 Maeyama ............ C09D 121/00
524/513
(Continued)

FOREIGN PATENT DOCUMENTS

CN  101376977 A  3/2009
CN  103079809 A  5/2013
(Continued)

OTHER PUBLICATIONS

Herrmann, New Developments and Applications in Hardness Metrology, Recent Advancement of Theory and Practice in Hardness Measurement, HARDMEKO 2007. (Year: 2007).*
(Continued)

*Primary Examiner* — Monique R Jackson
(74) *Attorney, Agent, or Firm* — Birch, Stewart, Kolasch & Birch, LLP

(57) ABSTRACT

Provided is a coated metal sheet for automobile comprising: a metal sheet; and a coating film ($\alpha$) present on at least one surface of the metal sheet. The coating film ($\alpha$) contains an
(Continued)

organic resin (A), an electrically conductive pigments (B), and anti-corrosion pigments (C), and a Martens micro-hardness HM at $-20°$ C. of the surface of the coating film ($\alpha$) is 10 to 200 (mg/mm$^2$) at 20 points or more when measured at 100 points, and a Martens micro-hardness HM at 40° C. of the surface of the coating film ($\alpha$) is 200 to 200,000 (mg/mm$^2$) at 5 points or more when measured at 100 points.

8 Claims, 7 Drawing Sheets

(51) Int. Cl.
    *C09D 5/24*     (2006.01)
    *C09D 7/48*     (2018.01)
    *C09D 7/61*     (2018.01)
    *B62D 29/00*     (2006.01)
    *C23C 28/00*     (2006.01)

(52) U.S. Cl.
    CPC .............. *C09D 7/61* (2018.01); *C09D 175/04* (2013.01); *C23C 28/00* (2013.01)

(56) References Cited

U.S. PATENT DOCUMENTS

| | | |
|---|---|---|
| 2004/0228975 A1 | 11/2004 | Takesako et al. |
| 2005/0065269 A1 | 3/2005 | Hintze-Bruning et al. |
| 2006/0177685 A1* | 8/2006 | Matsuda ................ B32B 15/08 428/621 |
| 2008/0081196 A1* | 4/2008 | Saito ...................... C09D 5/084 428/425.8 |
| 2008/0233390 A1* | 9/2008 | Gothlich ................ B05D 7/52 428/336 |
| 2009/0048378 A1 | 2/2009 | Kawazu et al. |
| 2011/0111130 A1* | 5/2011 | Hickl ...................... B05D 7/544 427/388.2 |
| 2011/0212326 A1* | 9/2011 | Ettrich .................. B05D 1/185 428/335 |
| 2011/0217565 A1 | 9/2011 | Tada et al. |
| 2012/0189840 A1* | 7/2012 | Nishimoto ............. B65H 27/00 428/330 |
| 2012/0276394 A1* | 11/2012 | Yamamoto ............ C23C 18/122 428/447 |
| 2013/0126799 A1* | 5/2013 | Naoi ....................... H01B 1/22 252/514 |
| 2013/0161062 A1 | 6/2013 | Yamaoka et al. |
| 2013/0196072 A1 | 8/2013 | Groenewolt et al. |
| 2014/0023879 A1* | 1/2014 | Shibao .................... C09D 5/08 428/612 |
| 2015/0044450 A1 | 2/2015 | Yuasa et al. |
| 2017/0101545 A1* | 4/2017 | Hara ....................... C09D 7/61 |
| 2018/0314180 A1* | 11/2018 | Watanabe .......... G03G 15/0233 |

FOREIGN PATENT DOCUMENTS

| | | |
|---|---|---|
| CN | 103180136 A | 6/2013 |
| CN | 103781627 A | 5/2014 |
| DE | 10236349 A1 | 2/2004 |
| JP | 6-184465 A | 7/1994 |
| JP | 9-241866 A | 9/1997 |
| JP | 2003-245605 A | 9/2003 |
| JP | 2003-251272 A | 9/2003 |
| JP | 2003-253211 A | 9/2003 |
| JP | 2005-15516 A | 1/2005 |
| JP | 2007-169397 A | 7/2007 |
| JP | 2009-197148 A | 9/2009 |
| JP | 2010-65254 A | 3/2010 |
| JP | 2013-527867 A | 7/2013 |
| JP | 5568191 B1 | 8/2014 |
| JP | 2015-202686 A | 11/2015 |
| WO | WO 02/062907 A2 | 8/2002 |
| WO | WO 2005/069877 A2 | 8/2002 |
| WO | WO 03/062328 A1 | 7/2003 |

OTHER PUBLICATIONS

Fischer Instruments, Picodentor HM500, Product Information, downloaded from https://www.helmut-fischer.com on Mar. 1, 2020. (Year: 2020).*
Glass Transition Temperature, Polymer Properties Database, downloaded from www.polymerdatabase.com on Jun. 7, 2016. (Year: 2016).*
Extended European Search Report, dated Mar. 5, 2018, for corresponding European Application No. 15845812.5.
Canadian Office Action for corresponding Application No. 2,962,729, dated May 28, 2018.
Chinese Office Action and Search Report for corresponding Application No. 201580064540.9, dated May 30, 2018, with a partial English translation of the Office Action.
Indian Office Action and Search Report, dated Jun. 14, 2019, for corresponding Indian Application No. 201717011161, with an English translation.
Chinese Office Action dated Jan. 28, 2019, for corresponding Chinese Application No. 201580064540.9, with partial English translation.
International Search Report for PCT/JP2015/077845 dated Dec. 1, 2015.
Written Opinion of the International Searching Authority for PCT/JP2015/077845 (PCT/ISA/237) dated Dec. 1, 2015.

* cited by examiner

COATED METAL SHEET FOR AUTOMOBILE EXCELLENT IN RUST RESISTANCE IN LOW TEMPERATURE RUNNING ENVIRONMENTS

TECHNICAL FIELD

The present invention relates to a coated metal sheet for automobile having chipping resistance and being excellent in rust resistance in low temperature running environments.

BACKGROUND ART

The background art of the present invention will now be described.

Most automobile body members are formed of metal sheets such as steel sheets; and are produced by undergoing many processes of [1] a blank process that cuts a metal sheet to a prescribed size, [2] an oil cleaning process that cleans the metal sheet with oil, [3] a process that press-molds the blank, [4] a joining process that fashions the molded material into a member with a desired shape by spot welding, adhesion, or the like, [5] a process that removes the press oil of the surface of the member for cleaning, [6] a chemical conversion treatment process, and [7] an electrodeposition coating process. A car body member used as an outer sheet generally further undergoes coating processes such as [8] an intermediate coating process and [9] an topcoat process. Therefore, in the automotive industry, the needs for cost reduction by omitting or simplifying production processes, in particular the chemical conversion treatment process and the coating process, are high.

In response to these needs, studies have been made on using a coated metal sheet (a pre-coated metal sheet) for automobile body members in order to omit the chemical conversion treatment process, omit or simplify the electrodeposition coating process, and omit or reduce the amount of subsidiary materials during automobile manufacturing.

One of the important performance required for automobile body members is chipping resistance. Chipping refers to a phenomenon in which stones and the like spattered during the running of an automobile collide with the car body and at this time a coating film and a plating film are broken and peeled off. The phenomenon is a major problem in cold districts, and is called a low temperature chipping phenomenon. In cold districts, the coating film is exposed to low temperatures, and is affected by internal stress that is prone to contract. When the impact of stone spattering or the like is given to the coating film, not only is the coating film damaged, but also the underlying plating film is damaged, and furthermore cracking may occur up to the interface between the plating film and the steel sheet. This is considered to be due to the fact that the internal stress of the coating film acts on the plating film. The peeled portion of the plating film like this immediately leads to a reduction in corrosion resistance, and constitutes a serious problem with the automobile body coating system.

A measure that has been taken to cope with the chipping of automobile body members is to insert a chipping primer between an electrodeposition coating film and an intermediate coating film. The object of the chipping primer is to mitigate the impact on the coating film at the time of the collision of a stone by its function as a cushion layer. Hence, as the properties of the chipping primer, a high elasticity of the coating film, a large rate of extension of the coating film, and a high strength of the coating film are required.

As a chipping primer with a large rate of extension of the coating film, an aqueous chipping primer in which a glass transition temperature (Tg) is adjusted to 0 to −75° C. is described in Patent Literature 1 (JP 2003-251272A).

On the other hand, in the automotive industry, the needs for cost reduction by omitting or simplifying production processes, in particular the coating process, are high as described above, and an automobile body coating system by which an attached process such as chipping primer coating can be omitted is required.

For example, Patent Literature 2 (JP 2003-245605A) and Patent Literature 3 (JP 2005-15516A) describe a method for forming a laminated coating film in which rubber particles that absorb the impact of chipping are put into an intermediate coating film to provide chipping resistance, and thus the application of a chipping primer is omitted.

Patent Literature 4 (JP 2003-253211A) discloses an aqueous intermediate coating composition that is composed of a coating-formable resin, a hardener, a coloring pigment, talc, and a silane coupling agent and has chipping resistance.

All of Patent Literatures 2 to 4 aim to omit a chipping primer by a method in which, after an under-coating material such as an electrodeposition coating material is applied to an automotive steel sheet, an intermediate coating layer to be laminated is provided with chipping resistance. In contrast, there is not yet an automobile body coating system in which a coated metal sheet is used for an automobile body member and the coating film itself of the coated metal sheet is provided with chipping resistance, and thus a chipping primer is omitted.

CITATION LIST

Patent Literature

Patent Literature 1: JP 2003-251272A
Patent Literature 2: JP 2003-245605A
Patent Literature 3: JP 2005-15516A
Patent Literature 4: JP 2003-253211A

SUMMARY OF INVENTION

Technical Problem

The present invention has been made in view of the issue mentioned above, and relates to a coated metal sheet for automobile having chipping resistance and being excellent in rust resistance in low temperature running environments.

Solution to Problem

The present inventors have found that a chipping primer can be omitted by a method in which an organic resin used for conventional chipping primers that has a high rate of extension and a glass transition temperature Tg of 0° C. or less is used as a coating film of a coated metal sheet and thus chipping resistance is provided. However, the coating film formed of an organic resin with a glass transition temperature Tg of 0° C. or less has adhesiveness at normal temperature, and has had a problem that, when coated metal sheets are stored while being stacked, over- and underlying coated metal sheets adhere. The present inventors further conducted studies, and have solved the problem by putting particles having a specific hardness into the coating film and have been able to obtain a coated metal sheet for automobile having chipping resistance of the present invention.

The present invention is specifically described below.

[1]
A coated metal sheet for automobile comprising:
a metal sheet; and
a coating film (α) present on at least one surface of the metal sheet,
wherein the coating film (α) contains
an organic resin (A),
electrically conductive pigments (B), and
anti-corrosion pigments (C), and
a Martens micro-hardness HM at −20° C. of the surface of the coating film (α) is 10 to 200 (mg/mm$^2$) at 20 points or more when measured at 100 points, and a Martens micro-hardness HM at 40° C. of the surface of the coating film (α) is 200 to 200,000 (mg/mm$^2$) at 5 points or more when measured at 100 points.

[2]
The coated metal sheet for automobile according to [1], wherein a glass transition temperature Tg of the organic resin (A) is −80° C. to −20° C.

[3]
The coated metal sheet for automobile according to [1], wherein the organic resin (A) is selected from the group consisting of a polyester resin, a polyurethane resin, and an acrylic resin, and a modified product thereof.

[4]
The coated metal sheet for automobile according to [1], wherein the electrically conductive pigments (B) are non-oxide ceramic particles with an electrical resistivity at 25° C. of $0.1 \times 10^{-6}$ to $185 \times 10^{-6}$ Ωcm, the electrically conductive pigments being at least one selected from a boride, a carbide, a nitride, and a silicide.

[5]
The coated metal sheet for automobile according to [1], wherein the coating film (α) contains 0.5 vol % to 65 vol % of the electrically conductive pigments (B).

[6]
The coated metal sheet for automobile according to [1], wherein the anti-corrosion pigments (C) contain
one or more selected from a compound capable of releasing a silicate ion, a phosphate ion, a vanadate ion, a tungstate ion, or a molybdate ion,
one or more particles containing a metal element selected from the group consisting of Si, Ti, Al, and Zr, or
both thereof.

[7]
The coated metal sheet for automobile according to [1], wherein the coating film (α) contains 1 vol % to 40 vol % of the anti-corrosion pigments (C).

[8]
The coated metal sheet for automobile according to [1], comprising, in the coating film, granular particles (D) with a Martens hardness at 40° C. of 200 mg/mm$^2$ to 200,000 mg/mm$^2$.

[9]
An automobile component formed by processing and shaping the coated metal sheet for automobile according to [1].

[10]
An automobile component formed by further applying one or more of an electrodeposition coating layer, an intermediate coating layer, and an topcoat layer to the automobile component according to [9].

Advantageous Effects of Invention

In the coated metal sheet for automobile of the present invention, since the coating film itself has chipping resistance, the process of applying a chipping primer does not need to be provided in the coating process after the coated metal sheet is processed and shaped into an automobile component. Furthermore, the chipping resistance of the coating film is effective particularly in low temperature environments of −15° C. or less, and a coated metal sheet for automobile excellent in corrosion resistance can be provided.

DESCRIPTION OF EMBODIMENTS

Figure 1:
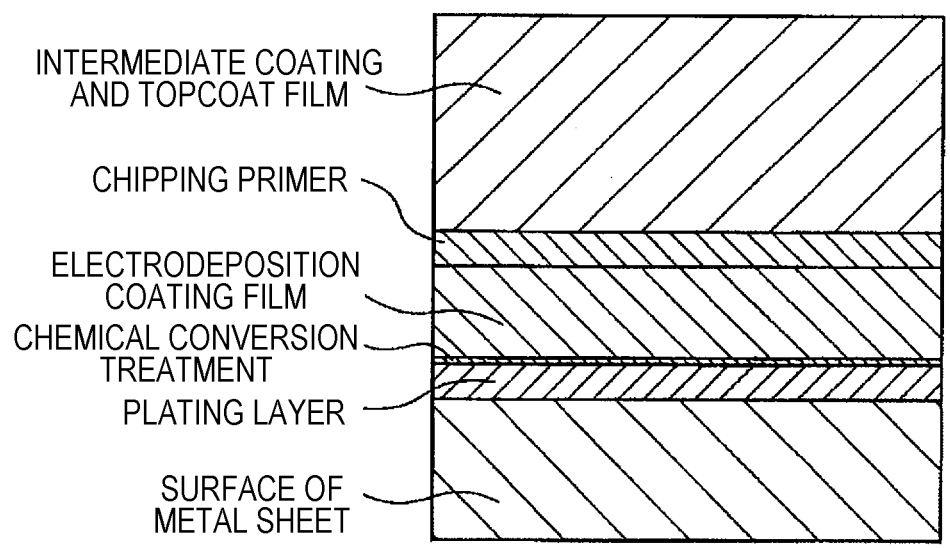
FIG. 1 shows a schematic diagram of a cross section of the configuration of a conventional automobile coating film comprising a chipping primer.
Figure 2:
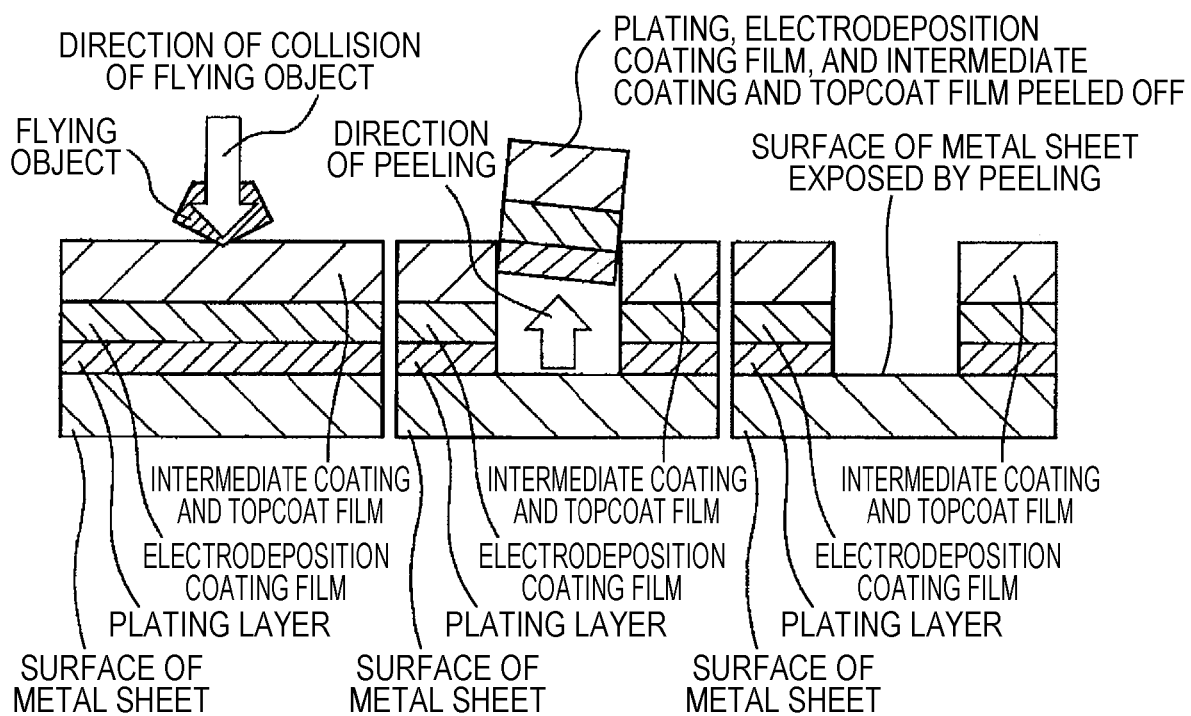
FIG. 2 shows a schematic diagram of a cross section of a coating film on the occasion when a flying object collides with an automobile body member and the surface of a metal sheet is exposed.
Figure 3:
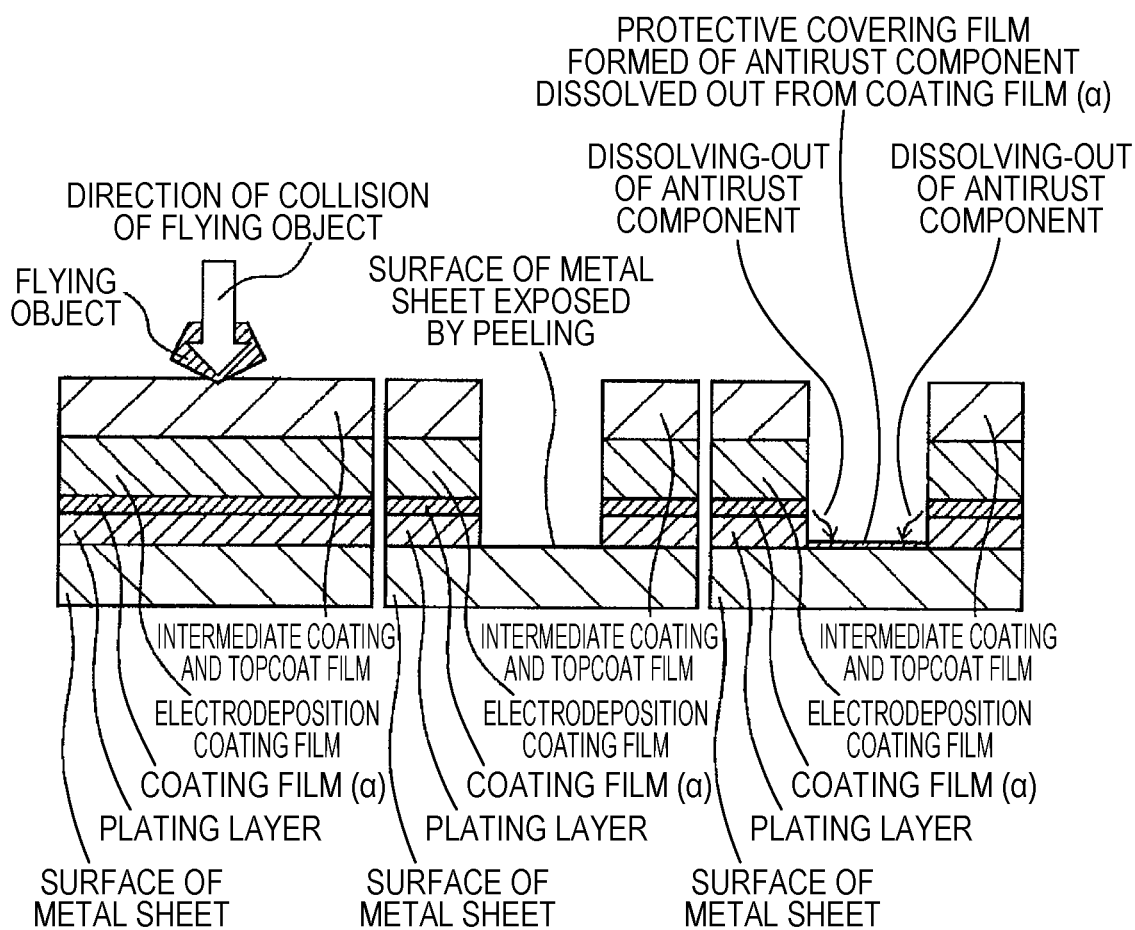
FIG. 3 shows a schematic diagram of a cross section of a coating film on the occasion when a flying object collides with an automobile body member that uses a coated metal sheet for automobile of the present invention and the metal sheet is exposed, and then an antirust component that is dissolved out from a coating film (α) due to wetting with water reacts on the exposed surface of the metal sheet to form a protective covering film.
Figure 4:
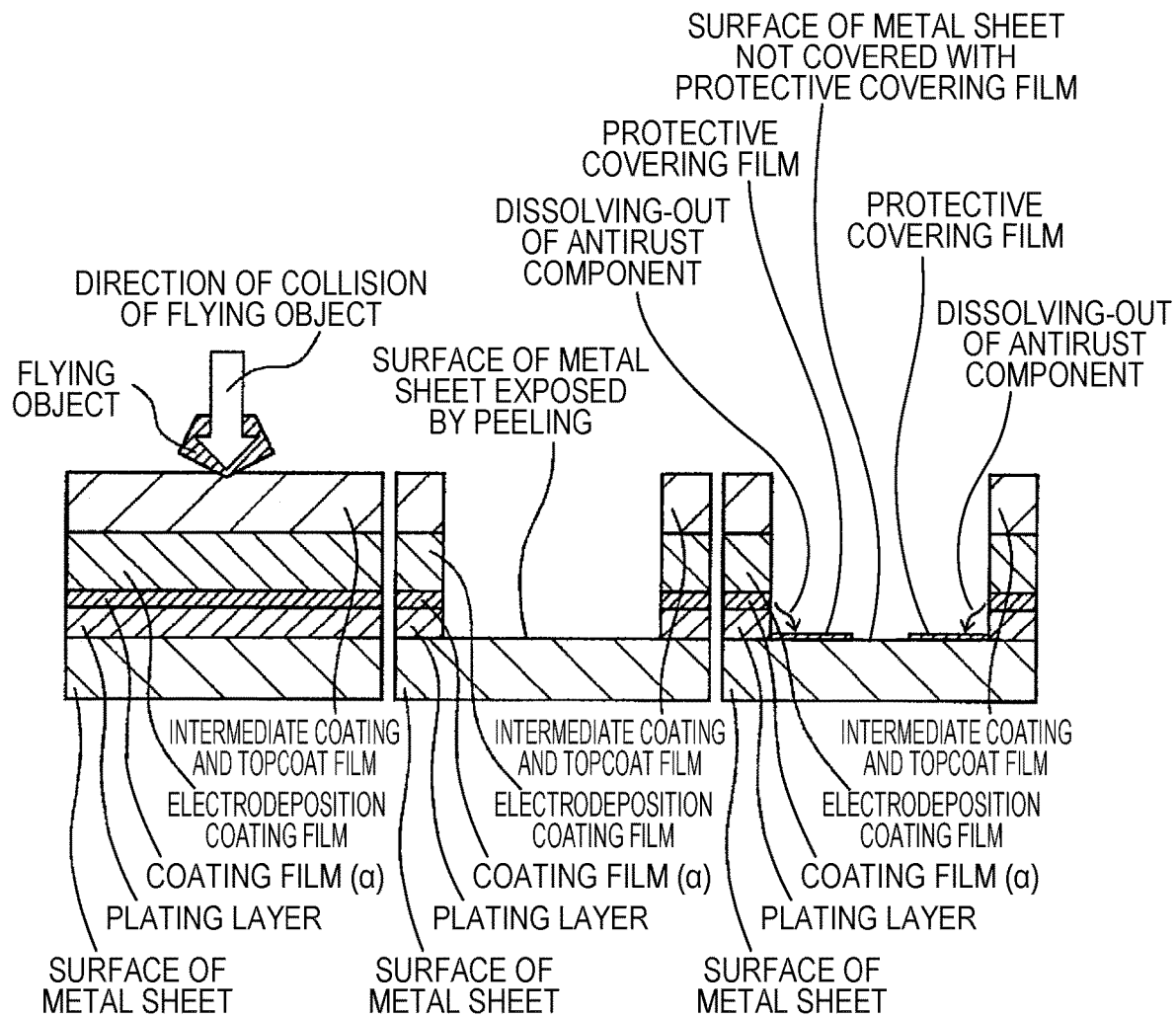
FIG. 4 shows a schematic diagram of a cross section of a coating film on the occasion when a flying object collides with an automobile body member that uses a coated metal sheet for automobile of which the properties of a coating film (α) do not conform to the range of the present invention, thus the overlying covering film, comprising a plating layer, is largely peeled off due to a large internal stress of the coating film (α), and the surface of the metal sheet is, even upon subsequent wetting with water, not sufficiently covered with a protective covering film formed of an antirust component that is derived from the coating film (α), because of the large exposure of the surface of the metal sheet.
Figure 5:
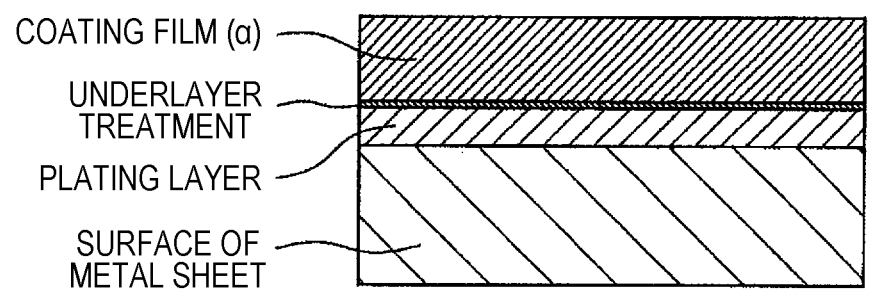
FIG. 5 shows a schematic diagram of a cross section of a coated metal sheet for automobile of the present invention in the case where underlayer treatment is performed.
Figure 6:
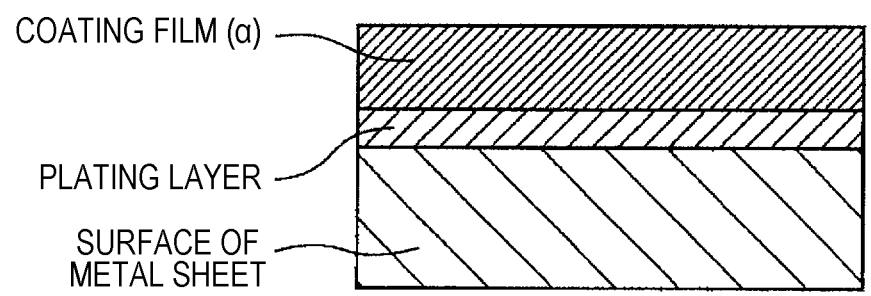
FIG. 6 shows a schematic diagram of a cross section of a coated metal sheet for automobile of the present invention in the case where underlayer treatment is not performed.

Hereinbelow, the present invention is described in detail.
<Metal Sheet>
A coated metal sheet for automobile of the present invention is, for example, a plating film-equipped metal sheet in which at least part of the surface is covered with a specific electrically conductive coating film. In the metal sheet, depending on the use, it is possible for both surfaces of the metal sheet to be covered with the electrically conductive coating film, or for only one surface to be covered, and it is possible for part of the surface to be covered, or for the entire surface to be covered. The part covered with the electrically conductive coating film of the metal sheet is excellent in resistance weldability and corrosion resistance.

Examples of the constituent metal of the plating film-equipped metal sheet that can be used for the coated metal sheet of the present invention comprise aluminum, titanium, zinc, copper, nickel, steel, and the like. The components of these metals are not particularly limited; for example, in the case of using steel, common steel or steel containing an additive element such as chromium may be used. However, since the metal sheet of the present invention is to be press-molded, in all cases of metal sheets it is preferable to appropriately control the type and the amount of addition of additive elements and the metal structure so that desired shaping processing followability is provided.

In the case where a steel sheet is used as the metal sheet, the type of the surface plating film is not particularly limited. Examples of the usable plating film include plating containing one of zinc, aluminum, cobalt, tin, and nickel, alloy plating containing any of these metal elements and another metal element and/or a non-metal element, and the like. In particular, examples of the zinc-based plating film include plating of zinc, alloy plating of zinc and at least one of aluminum, cobalt, tin, nickel, iron, chromium, titanium, magnesium, and manganese, and various zinc-based alloy platings further containing another metal element and/or non-metal element (e.g., quaternary alloy plating of zinc, aluminum, magnesium, and silicon); and the alloy components other than zinc are not particularly limited. Further, these plating films may contain, as a small amount of a different metal element or impurity, cobalt, molybdenum, tungsten, nickel, titanium, chromium, aluminum, manganese, iron, magnesium, lead, bismuth, antimony, tin, copper, cadmium, arsenic, or the like, and may contain a material in which an inorganic substance such as silica, alumina, or titania is dispersed.

Examples of the aluminum-based plating film include plating of aluminum, alloy plating of aluminum and at least one of silicon, zinc, and magnesium (e.g., alloy plating of aluminum and silicon, alloy plating of aluminum and zinc, and tertiary alloy plating of aluminum, silicon, and magnesium), and the like.

Further, also multiple-layer plating in which the plating mentioned above and another type of plating, such as iron plating, alloy plating of iron and phosphorus, nickel plating, and cobalt plating, are combined may be used.

The method for forming the plating film is not particularly limited. Examples include electroplating, electroless plating, hot dipping, vapor deposition plating, dispersion plating, and the like. The plating treatment method may be either the continuous system or the batch system. In the case of using a steel sheet, the treatment after plating may be zero spangle treatment that is an external appearance uniformity treatment after hot dipping, annealing treatment that is a modification treatment of the plating film, temper rolling for adjusting the surface condition or the material quality, etc.; but the treatment is not particularly limited to these in the present invention, and any appropriate treatment may be used.

<Coating Film ($\alpha$)>

A coating film ($\alpha$) that covers the metal sheet of the present invention contains an organic resin (A), electrically conductive pigments (B), and anti-corrosion pigments (C), and a Martens micro-hardness HM at $-20°$ C. of the surface of the coating film ($\alpha$) is 10 to 200 (mg/mm$^2$) at 20 points or more out of 100 points measured, and a Martens micro-hardness HM at $40°$ C. of the surface of the coating film ($\alpha$) is 200 to 200,000 (mg/mm$^2$) at 5 points or more out of 100 points measured.

The Martens micro-hardness HM is usually an indicator indicating the hardness, and prescribes the hardness of the surface of the coating film ($\alpha$) in the present invention. The Martens micro-hardness HM can be measured by using Nanoindenter HM 500 manufactured by Fischer Instruments K.K. and setting the indentation depth to 5 μm or less in a coating film with a thickness of 10 μm or more. In a coating film with a thickness of less than 10 μm, measurement may be performed by setting the indentation depth to ⅕ of the coating film thickness; but in this case, since the variation in measurement is large, the number of times of measurement is increased as appropriate, and the average value thereof is taken as the measurement value. In the present invention, a sheet that falls under both of the following cases is taken as the coated metal sheet for automobile of the present invention: when the Martens micro-hardness HM at $-20°$ C. is measured at 100 random points of the surface of the coating film ($\alpha$) of the coated metal sheet, HM is 10 to 200 (mg/mm$^2$) at 20 points or more of the 100 points; and when the Martens micro-hardness HM at $40°$ C. is measured at 100 random points, HM is 200 to 200,000 (mg/mm$^2$) at 5 points or more of the 100 points. Further, the case where the measurement of the Martens micro-hardness HM at $-20°$ C. at 100 random points yields an HM of 10 to 200 (mg/mm$^2$) at 40 points or more of the 100 points and furthermore the measurement of the Martens micro-hardness HM at $40°$ C. at 100 random points yields an HM of 200 to 200,000 (mg/mm$^2$) at 10 points or more of the 100 points is preferable, and the case where the measurement of the Martens micro-hardness HM at $-20°$ C. at 100 random points yields an HM of 10 to 200 (mg/mm$^2$) at 60 points or more of the 100 points and furthermore the measurement of the Martens micro-hardness HM at $40°$ C. at 100 random points yields an HM of 200 to 200,000 (mg/mm$^2$) at 20 points or more of the 100 points is more preferable.

Here, "random" refers to excluding, in the choice of 100 points that are measurement points, arbitrariness that leads to a biased measurement result. For example, certain 2 points may be set, and 100 points may be chosen at equal intervals or random intervals between the points; and then the Martens micro-hardness HM at $-20°$ C. and the Martens micro-hardness HM at $40°$ C. may be measured. In this case, the interval between adjacent measurement points is preferably set so that the measurement points are not influenced by the each other's hardness. Although 100 points are chosen in the above, it is presumed that, as the number of measurement points increases, the measurement value is averaged more, and precision is improved.

The inventors have found that, when a metal sheet that comprises the coating film ($\alpha$) of the present invention and is provided with electrodeposition coating, intermediate coating, and topcoat for automobile receives the spattering of a flying stone in a low temperature environment, significant flaw marking due to the impact of stone spattering that would lead to the peeling of the plating layer is suppressed in the case where the coating film ($\alpha$) is sufficiently flexible even in a low temperature environment, as compared to other cases. Further, the inventors have found that significant flaw marking is suppressed in the case where the Martens micro-hardness of the coating film ($\alpha$) in a low temperature environment is in a low range of 10 to 200 (mg/mm$^2$).

In the case where the coating film ($\alpha$) is not sufficiently flexible at low temperature, the topcoat film, the intermediate coating film, and the electrodeposition coating film are broken by the impact of stone spattering, and in addition the coating film ($\alpha$) is broken. It has been found that, in this case, the contraction stress of these coating films released by the breaking is transferred as stress that peels off the plating layer, and consequently the plating layer is largely peeled off. On the other hand, it has been found that, in the case where the coating film ($\alpha$) has sufficient flexibility at low temperature, even when the coating film lying on the coating film (α) is broken by the impact of stone spattering, the contraction stress is absorbed by the deformation of the coating film (α) and is not transferred to the plating layer, and consequently the peeling of the plating layer is suppressed. Thus, it has been found that, in the case where the peeling of the plating layer is suppressed even when the overlying coating film is flawed, the corrosion of the surfaces of the plating layer and the underlayer metal sheet exposed in the flawed portion is suppressed by the action of the anti-corrosion pigments contained in the coating film (α), and therefore chipping corrosion resistance is high.

According to the investigation by the inventors, it has been found that the coating film (α) was flexible enough to sufficiently exhibit the effect described above in the case where the Martens micro-hardness HM measured from the surface of the coating film (α) was 10 to 200 at −20° C. at 20 points or more among 100 random measurement points. It has been found that, if HM was more than 200, the coating film (α) was not flexible, and the effect of suppressing the transfer of the contraction stress of the coating film to the plating layer was insufficient. The lower limit of HM at −20° C. is not particularly specified; but since a resin that provides a coating film (α) with an HM at −20° C. of less than 10 cannot be obtained at ordinary industrial costs, this value serves as the practical lower limit.

In the case of a coating film (α) that is flexible at low temperature to such a degree as to have a part with an HM at −20 of 200 or less, when coating film-equipped metal sheets are held so as to be superimposed in a situation of storage, transportation, etc. at what is called normal temperature of approximately −20 to 40° C., it is likely that coating films (α) will mutually adhere or fuse and industrial handling will be interfered with. According to the investigation by the inventors, it has been found that the mutual adhesion or fusion between coating films (α) mentioned above was sufficiently suppressed in the case where the Martens micro-hardness HM measured from the surface of the coating film (α) was 200 to 200,000 at 40° C. at 5 points or more among 100 random measurement points. It is presumed that, when coating film-equipped metal sheets are held so as to be superimposed in a situation of storage, transportation, etc. at what is called normal temperature of approximately 20 to 40° C., the contact of parts with a low HM at −20° C. of 10 to 200 described above is suppressed by the presence of a part with a high HM at 40° C. on the surface of the coating film (α) like the above, and consequently the adhesion or fusion of coating films (α) is prevented. The effect described above is reduced in the case where the number of points at which the Martens micro-hardness HM at 40° C. is 200 to 200,000 is less than 5 among 100 random measurement points.

The Martens micro-hardness HM at −20° C. of the coating film (α) can generally be controlled by appropriately selecting the organic resin (A) and a hardener of the composition for the coating film. Specific examples of the method include a method in which the resin molecular structure is formed so as to include an easy-to-deform, flexible structure in which the molecular weight of the part between crosslinking points is large, a method in which the type and the amount of addition of the hardener are adjusted to keep low the density of crosslinks between molecular chains of the resin, and a method in which the baking temperature of the coating film is reduced or the baking time is shortened and thereby the crosslinking reaction produced by the hardener is mitigated.

Hereinafter, the coating composition for obtaining the coating film (α) in the present invention is referred to as a coating composition (β). Examples of the coating composition (β) include a water-based coating composition and an organic solvent-based coating composition.

In the present invention, the "water-based coating composition" refers to a composition composed using a "water-based solvent" in which water accounts for 50 mass % or more of the entire solvent. Further, the "organic solvent-based coating composition" refers to a composition composed using an "organic solvent-based solvent" in which an organic solvent accounts for 50 mass % or more of the entire solvent.

Examples of the constituent component other than water of the "water-based solvent" mentioned above include an inorganic acid that mixes with water well, such as sulfuric acid, nitric acid, hydrochloric acid, phosphoric acid, boric acid, and hydrofluoric acid, an inorganic salt that is soluble in water, such as water-soluble metal salts and ammonium salts of the inorganic acids mentioned above, an inorganic compound that is soluble in water, such as silicates, thiosulfates, and thiocyanates, and an organic compound that mixes with water. Further, an organic solvent may be added to the "water-based solvent" mentioned above as necessary. However, in the "water-based coating composition" of the present invention, it is preferable from the viewpoint of labor hygiene that the type and the amount of addition of the organic solvent be adjusted so as to obtain a coating composition that does not fall under the organic solvents etc. (class 1 organic solvents, class 2 organic solvents, or class 3 organic solvents, or materials containing more than 5 mass % of the organic solvent mentioned above) defined in Enforcement Ordinance of Industrial Safety and Health Law (Ordinance on the Prevention of Organic Solvent Poisoning, Chapter 1, Section 1).

Preferred examples of the method for producing a film on the metal sheet in the case of a water-based or solvent-based coating composition include a method in which the coating composition (β) is applied onto the metal sheet by a known coating method such as roll coating, groove roll coating, curtain flow coating, roller curtain coating, dipping, or air knife squeezing, and then the water or solvent of the wet coating film is removed to dryness. Preferred examples of the method for curing these dried coating films include curing by polymerization by heating and baking the organic resin in the coating film; for example, polymerization or curing by ultraviolet irradiation may be used when the resin in the coating film can be polymerized by ultraviolet light, and polymerization or curing by electron beam irradiation may be used when the resin in the coating film can be polymerized by an electron beam.

An underlayer treatment covering film may be provided between the coating film (α) and the surface of the metal sheet for the purposes of further improving the adhesiveness to the metal sheet, the corrosion resistance, etc. of the coating film. In the case where an underlayer treatment covering film is provided, the number and composition of the layer is not limited; but in order not to impair the processing followability and corrosion resistance of the coating film (α) at the time of shaping-processing the metal sheet, it is necessary that the underlayer treatment covering film be excellent in adhesiveness to the metal sheet and the overlying coating film (α). In view of the compatibility with the environment, the underlayer treatment covering film preferably has a chromate-free composition. Further, in order to ensure sufficient electrical conductivity in the thickness direction of the covering film, the thickness of the underlayer treatment covering film is preferably set to 0.5 μm or less.

In the case of providing the underlayer treatment covering film, the method for producing the underlayer treatment covering film is not limited as long as it is an industrially applicable film production method. Examples of the method for producing the underlayer treatment covering film include forming a film out of a composition for underlayer treatment by application, vapor deposition, film sticking, etc.; from the viewpoints of film production cost (productivity), versatility, etc., a method based on the application and drying of a water-based or solvent-based composition for underlayer treatment is preferable. In the case of using a water-based or solvent-based composition for underlayer treatment, a multiple-layer coating film may be formed by repeating the application and drying of each layer from the lowermost layer to the outermost layer of a plurality of coating films comprising the underlayer treatment covering film (a successive coating method). Further, as a method for forming the coating film on the surface of the metal sheet simply and efficiently, film production may be performed by a laminating method that comprises the following processes in this order: a process in which a plurality of coating films of the lowermost layer in contact with the surface of the metal sheet to the outermost layer are applied for covering successively or simultaneously in a wet state (the process of wet-on-wet application or multiple-layer simultaneous application of a coating composition); a drying process in which the water or solvent of the covering films in a wet state is removed to dryness simultaneously; and a film production process in which the multiple-layer coating film mentioned above is cured. Here, the wet-on-wet coating method is a method in which a coating liquid is applied onto the metal sheet, then another coating liquid is applied onto the coating liquid in a solvent-containing state while the preceding coating liquid is not yet dried (in a wet state), the solvents of the resulting laminate coating liquid are simultaneously removed to dryness for curing, and thus a film is produced. The multiple-layer simultaneous coating method is a method in which, using a multiple-layer slide-type curtain coater, a slot die coater, or the like, a plurality of layers of coating liquids are simultaneously applied in a laminate state onto the metal sheet, then the solvents of the laminate coating liquid are simultaneously removed to dryness for curing, and thus a film is produced.

The average thickness of the coating film ($\alpha$) that covers the metal sheet of the present invention is preferably in the range of 0.5 to 30 μm, and more preferably in the range of 1 to 15 μm. At thicknesses less than 0.5 μm, the coating film is too thin to hold a sufficient amount of the anti-corrosion pigments, and corrosion resistance may not be obtained. If the coating film thickness is more than 30 μm, the amount of the coating composition ($\beta$) used is increased and production cost is increased, and furthermore the coating film may aggregate and break or be peeled off during press molding. In addition, due to the thick film, the electrical insulation in the film thickness direction is increased, and resistance welding becomes difficult. Furthermore, in the case where a water-based coating composition is used, it is highly likely that a coating defect such as foaming will occur, and it is not easy to stably obtain an external appearance necessary as an industrial product.

The thickness of the coating film ($\alpha$) can be measured by the cross-sectional observation of the coating film or the like. Alternatively, based on the fact that the calculation value obtained by a method in which the mass of the coating film attached to unit area of the metal sheet is divided by the specific gravity of the coating film or the specific gravity after drying of the coating composition ($\beta$) is expected to be a value close to the measurement value obtained by cross-sectional observation, a method of performing calculation simply using specific gravity is possible. The method for determining the mass of the coating film attached may be appropriately selected from existing methods, such as measuring the mass difference between before and after coating, measuring the mass difference between before and after the peeling of the coating film after coating, or performing X-ray fluorescence analysis on the coating film to measure the amount of existence of an element of which the amount contained in the coating film has been found in advance. The method for determining the specific gravity of the coating film or the specific gravity after drying of the coating composition ($\beta$) may be appropriately selected from existing methods, such as measuring the capacity and mass of the isolated coating film, measuring the capacity and mass of the dried coating composition ($\beta$) obtained by putting a suitable amount of it into a container and performing drying, or performing calculation from the amounts of the blended constituent components of the coating film and the known specific gravity of each component.

<Organic Resin (A)>

The organic resin (A) of the present invention is a binder component of the coating film ($\alpha$); by appropriately selecting this, the Martens micro-hardness HM at $-20°$ C. and Tg necessary for the coating film of the coated metal sheet for automobile of the present invention can be obtained. The organic resin (A) may be either of a water-based resin and an organic solvent-based resin, and is particularly a resin (A1) described later. The organic resin (A) may further contain a reaction derivative (A2) of the resin (A1).

The organic resin (A) of the present invention preferably has a glass transition temperature Tg of $-80°$ C. to $-20°$ C., as described in detail below.

The coating composition ($\beta$) used to form the coating film ($\alpha$) in the present invention may be either of a water-based composition and an organic solvent-based composition, and contains 50 to 100 mass % of a resin (A1) described later based on its nonvolatile content. The resin (A1) exists stably in the coating composition ($\beta$). When such coating composition ($\beta$) is applied to the metal sheet and heating is performed, in many cases, the resin (A1) does not react but dries as it is. In the case where a silane coupling agent, a hardener, a crosslinker, or the like is contained in the coating composition ($\beta$), at least part of the resin (A1) reacts with them to form a derivative (A2) of the resin (A1). Thus, in this case, the material comprising the unreacted resin (A1) and the reaction derivative (A2) of the resin (A1) serves as the organic resin (A) that is a binder component of the coating film ($\alpha$).

The type of the resin (A1) is not particularly limited, and may be, for example, a polyurethane resin, a polyester resin, an epoxy resin, a (meth)acrylic resin, or a polyolefin resin, a modified product thereof, or the like as long as it has a necessary Martens micro-hardness HM and a necessary glass transition temperature Tg. One of or a mixture of two or more of these may be used as the resin (A1), or at least one organic resin may be modified and one of or a mixture of two or more of the resulting organic resin(s) may be used as the resin (A1).

Preferred examples of the resin (A1) include a polyurethane resin, a polyurethane resin modified product, and a polyurethane resin composite, a mixture of these and another resin, and the like. The urethane group (—NHCOO—) in a polyurethane resin has a higher molecular aggregation energy (8.74 kcal/mol) than many other organic groups; therefore, when a polyurethane resin is contained in the resin (A1), the adhesiveness of the coating film is increased, the peeling and galling of the coating film are less likely to occur during press molding, and in addition the effect of improving corrosion factor blocking properties (the denseness of the coating film) to enhance corrosion resistance is exhibited by virtue of the relatively high aggregation energy. The molecular aggregation energies of organic groups other than the urethane group, for example a methylene group (—CH$_2$—), an ether group (—O—), a secondary amino group (an imino group, —NH—), an ester group (—COO—), and a benzene ring, are 0.68 kcal/mol, 1.00 kcal/mol, 1.50 kcal/mol, 2.90 kcal/mol, and 3.90 kcal/mol, respectively; thus, the molecular aggregation energy of the urethane group (—NHCOO—) is much higher than these. Hence, in many cases, a coating film containing a polyurethane resin has higher adhesiveness than a coating film made of many other resins, such as a polyester resin, a (meth)acrylic resin, and a polyolefin resin, and has high corrosion resistance.

As described above, the type of the resin (A1) is not particularly limited as long as it has a necessary glass transition temperature Tg. It is preferable that the resin (A1) be a resin containing, in its structure, at least one functional group selected from a carboxyl group (—COOH), a carboxylate group (—COO$^-$M$^+$; M$^+$ represents a monovalent cation), a sulfonic acid group (—SO$_3$H), a sulfonate group (—SO$_3^-$M$^+$; M$^+$ represents a monovalent cation), a primary amino group (—NH$_2$), a secondary amino group (—NHR$^1$; R$^1$ represents a hydrocarbon group), a tertiary amino group (—NR$^1$R$^2$; R$^1$ and R$^2$ individually represent a hydrocarbon group), a quaternary ammonium salt group (—N$^+$R$^1$R$^2$R$^3$X$^-$; R$^1$, R$^2$, and R$^3$ individually represent a hydrocarbon group, and X$^-$ represents a monovalent anion), a sulfonium salt group (—S$^+$R$^1$R$^2$X$^-$; R$^1$ and R$^2$ individually represent a hydrocarbon group, and X$^-$ represents a monovalent anion), and a phosphonium salt group (—P$^+$R$^1$R$^2$R$^3$X$^-$; R$^1$, R$^2$, and R$^3$ individually represent a hydrocarbon group, and X$^-$ represents a monovalent anion). Details and specific examples of these are described later.

Examples of the resin used for the coating composition (β) for obtaining the coating film (α) in the present invention may include a water-soluble or solvent-soluble resin that is completely dissolved in water or an organic solvent, and a resin that is dispersed in water or a solvent uniformly and finely in the form of emulsion, suspension, or the like (a water dispersible resin or a solvent dispersible resin). Here, the "(meth)acrylic resin" refers to an acrylic resin and a methacrylic resin.

Among the examples of the resin (A1) mentioned above, examples of the polyurethane resin include a material obtained by reacting a polyol compound and a polyisocyanate compound together and then performing chain extension using a chain extender, and the like. The polyol compound is not particularly limited as long as it is a compound containing two or more hydroxyl groups per molecule, and examples include ethylene glycol, propylene glycol, diethylene glycol, 1,6-hexanediol, neopentyl glycol, triethylene glycol, glycerin, trimethylolethane, trimethylolpropane, a polycarbonate polyol, a polyester polyol, a polyether polyol such as bisphenol hydroxypropyl ether, a polyesteramide polyol, an acrylic polyol, and a polyurethane polyol, and a mixture thereof. The polyisocyanate compound is not particularly limited as long as it is a compound containing two or more isocyanate groups per molecule, and examples include an aliphatic isocyanate such as hexamethylene diisocyanate (HDI), an alicyclic diisocyanate such as isophorone diisocyanate (IPDI), an aromatic diisocyanate such as tolylene diisocyanate (TDI), and an aromatic aliphatic diisocyanate such as diphenylmethane diisocyanate (MDI), and a mixture thereof. The chain extender is not particularly limited as long as it is a compound containing one or more active hydrogen atoms in a molecule, and water or an amine compound may be used. Examples of the amine compound include an aliphatic polyamine such as ethylenediamine, propylenediamine, hexamethylenediamine, diethylenetriamine, dipropylenetriamine, triethylenetetramine, and tetraethylenepentamine, an aromatic polyamine such as tolylenediamine, xylylenediamine, and diaminodiphenylmethane, an alicyclic polyamine such as diaminocyclohexylmethane, piperazine, 2,5-dimethylpiperazine, and isophoronediamine, a hydrazine-based compound such as hydrazine, dihydrazide succinate, dihydrazide adipate, and dihydrazide phthalate, an alkanolamine such as hydroxyethyldiethylenetriamine, 2-[(2-aminoethyl)amino]ethanol, and 3-aminopropanediol, and the like.

In the case where it is desired to obtain a water-based polyurethane resin, for example, a method in which, during resin production, at least part of the polyol compounds mentioned above are replaced with a carboxyl group-containing polyol compound, the carboxyl group-containing polyol compound is reacted with a polyisocyanate compound to introduce a carboxyl group into the resin chain, and then the carboxyl group is neutralized with a base to produce a water-based resin may be used. Alternatively, a method in which, during resin production, at least part of the polyol compounds mentioned above are replaced with a polyol compound having a secondary amino group or a tertiary amino group in a molecule, the polyol compound is reacted with a polyisocyanate compound to introduce a secondary amino group or a tertiary amino group into the resin chain, and then neutralization is performed with an acid to produce a water-based resin may be used. In the case where a tertiary amino group is present on the resin chain, an alkyl group may be introduced into the tertiary amino group to produce a quaternary amino group, and thereby a water-based cationic resin having a quaternary ammonium salt group can be obtained. These compounds may be used singly or in a mixture of two or more.

As mentioned above, the polyurethane resin that can be used as the resin (A1) is preferably a polyurethane resin containing a large amount of aromatic rings in the molecular structure. In such a polyurethane resin, a glass transition temperature is higher than that of a polyurethane resin having no aromatic ring or having a limited amount of aromatic rings in the molecular structure, the molecular chain is rigid and the resistance to the deformation of the coating film is strong, and the rate of extension deformation of the coating film is low; therefore, the hardness of the coating film (α) needed in the present invention are higher than in a polyurethane resin having no aromatic ring or a limited amount of aromatic rings. Thus, although there is no particular limit on the polyol compound, the polyisocyanate compound, and the chain extender used for resin production, it is preferable to use an aromatic aliphatic or aromatic alicyclic compound or the like containing a large amount of aromatic rings.

Among the examples of the resin (A1) mentioned above, the polyester resin is not particularly limited as long as it has a necessary HM and a necessary glass transition temperature Tg. Examples include a material obtained by the dehydration condensation polymerization of a polyol such as ethylene glycol, 1,3-propanediol, 1,2-propanediol, propylene glycol, diethylene glycol, 1,6-hexanediol, neopentyl glycol, triethylene glycol, bisphenol hydroxypropyl ether, 2-methyl-1,3-propanediol, 2,2-dimethyl-1,3-propanediol, 2-butyl-2-ethyl-1,3-propanediol, 1,4-butanediol, 2-methyl-1,4-butanediol, 2-methyl-3-methyl-1,4-butanediol, 1,5-pentanediol, 3-methyl-1,5-pentanediol, 1,6-hexanediol, 1,4-cyclohexanedimethanol, 1,2-cyclohexanedimethanol, 1,3-cyclohexanedimethanol, hydrogenated bisphenol A, a dimer diol, trimethylolethane, trimethylolpropane, glycerin, and pentaerythritol, and a polyvalent carboxylic acid such as phthalic acid, phthalic anhydride, tetrahydrophthalic acid, tetrahydrophthalic anhydride, hexahydrophthalic acid, hexahydrophthalic anhydride, methyltetraphthalic acid, methyltetrahydrophthalic anhydride, isophthalic acid, terephthalic acid, succinic anhydride, adipic acid, sebacic acid, maleic acid, maleic anhydride, itaconic acid, fumaric acid, Himic Anhydride, trimellitic acid, trimellitic anhydride, pyromellitic acid, pyromellitic anhydride, azelaic acid, succinic acid, succinic anhydride, lactic acid, dodecenylsuccinic acid, dodecenylsuccinic anhydride, cyclohexane-1,4-dicarboxylic acid, and an acid anhydride in the endo form. Also a water-based resin obtained by neutralizing these with ammonia, an amine compound, or the like, etc. may be given.

Among the examples of the resin (A1) mentioned above, the epoxy resin is not particularly limited as long as it has a necessary HM and a necessary glass transition temperature Tg. For example, it is obtained by reacting an epoxy resin such as a bisphenol A type epoxy resin, a bisphenol F type epoxy resin, a resorcin type epoxy resin, a hydrogenated bisphenol A type epoxy resin, a hydrogenated bisphenol F type epoxy resin, a resorcin type epoxy resin, and a novolac type epoxy resin with an amine compound such as diethanolamine and N-methylethanolamine. Further, a water-based resin obtained by neutralizing these with an organic acid or an inorganic acid, a water-based material obtained by radically polymerizing a high acid value acrylic resin in the presence of the epoxy resin mentioned above and then performing neutralization with ammonia, an amine compound, or the like, etc. may be given.

Among the examples of the resin (A1) mentioned above, the (meth)acrylic resin is not particularly limited as long as it has a necessary HM and a necessary glass transition temperature Tg. Examples include a material obtained by radically polymerizing an alkyl (meth)acrylate such as ethyl (meth)acrylate, 2-ethylhexyl (meth)acrylate, and n-butyl (meth)acrylate, a hydroxyalkyl (meth)acrylate such as 2-hydroxyethyl (meth)acrylate, or a (meth)acrylic acid ester such as an alkoxysilane (meth)acrylate together with (meth) acrylic acid in water using a polymerization initiator. The polymerization initiator is not particularly limited, and examples include a persulfate such as potassium persulfate and ammonium persulfate, an azo compound such as azobis (cyanovaleric acid) and azobisisobutyronitrile, and the like. Here, the "(meth)acrylate" refers to an acrylate and a methacrylate, and "(meth)acrylic acid" refers to acrylic acid and methacrylic acid.

Among the examples of the resin (A1) mentioned above, the polyolefin resin is not particularly limited as long as it has a necessary glass transition temperature Tg. Examples include a material obtained by radically polymerizing ethylene and an unsaturated carboxylic acid such as methacrylic acid, acrylic acid, maleic acid, fumaric acid, itaconic acid, or crotonic acid under high temperature and high pressure. Further, a water-based resin obtained by neutralizing these with ammonia, an amine compound, a basic metal compound such as KOH, NaOH, or LiOH, ammonia, an amine compound, or the like containing the metal compound mentioned above, or the like, etc. may be given.

The above examples of the resin (A1) may be used singly or in a mixture of two or more. Further, as a main component of the coating composition (β), one or more components of a composite resin that is obtained by modifying at least part of at least one of the examples of the resin (A1) in the presence of the same resin (A1) may be used as the resin (A1) as a whole.

<Glass Transition Temperature Tg of Organic Resin (A)>

A glass transition temperature Tg of the organic resin (A) is preferably −80° C. to −20° C. The glass transition temperature Tg can be measured by a method in which the organic resin that forms the coating film is cured by heating at a maximum heating temperature of 200° C. to form a film with a film thickness of 15 μm, and the maximum heating temperature of a differential scanning calorimeter (DSC) or the transition temperature in a dynamic viscoelasticity measuring apparatus is taken as the transition temperature Tg. Tg is preferably not less than −80° C. and not more than −20° C. A resin with a Tg higher than −20° C. has low flexibility, and therefore has limited capability to mitigate the transfer to the plating layer of the contraction stress of the coating film that is released in association with the flaw marking of the coating film due to the collision of stone spattering. The lower limit of Tg is not particularly prescribed, but an organic resin having a Tg lower than −80° C. is difficult to industrially obtain at low cost. Tg is more preferably not less than −60° C. and not more than −30° C.

<Electrically Conductive Pigments (B)>

As the electrically conductive pigments (B), one or more selected from a metal, an alloy, electrically conductive carbon, iron phosphide, a carbide, and a semiconductor oxide are preferably used. Examples include a metal such as zinc, nickel, iron, aluminum, cobalt, manganese, copper, tin, and chromium, a powder of an alloy thereof, electrically conductive carbon, an electrically conductive carbon powder such as graphite powder, iron phosphide powder, a powder of a carbide such as titanium carbide and silicon carbide, an electrically conductive semiconductor powder, ceramic particles, and the like. Among these, non-oxide ceramic particles are particularly preferable in the coated metal sheet of the present invention.

In the case where non-oxide ceramic particles are used, even when the coating composition (β) for obtaining the coating film (α) is a water-based composition, these non-oxide ceramic particles are not degraded in the composition, and maintain high electrical conductivity permanently. Hence, excellent resistance weldability can be maintained for a very long period of time as compared to electrically conductive particles that are degraded due to water, such as base metal particles and ferrosilicon particles.

The non-oxide ceramic that forms the non-oxide ceramic particle contained in the coating film (α) of the present invention is a boride ceramic, a carbide ceramic, a nitride ceramic, or a silicide ceramic of which the electrical resistivity (volume resistivity, specific resistance) at 25° C. is in the range of $0.1 \times 10^{-6}$ to $185 \times 10^{-6}$ Ωcm. The non-oxide ceramic herein is a ceramic made of an element other than oxygen or a compound not containing oxygen. The boride ceramic, the carbide ceramic, the nitride ceramic, and the silicide ceramic herein are non-oxide ceramics containing boron B, carbon C, nitrogen N, and silicon Si as a main non-metal constituent element, respectively. Among these, one having an electrical resistivity at 25° C. of less than $0.1 \times 10^{-6}$ Ωcm is not found. In the case where the electrical resistivity (volume resistivity, specific resistance) at 25° C. of the non-oxide ceramic is more than $185 \times 10^{-6}$ Ωcm, a large amount of addition to the coating film is needed in order to provide the resin coating film with sufficient electrical conductivity, and significant peeling and galling of the coating film occur during the press molding of the coated metal sheet of the present invention and corrosion resistance is reduced; thus, this is not suitable.

Since the non-oxide ceramic particle contained in the coating film (α) of the present invention has high electrical conductivity, the amount of addition for providing the resin coating film with sufficient electrical conductivity is allowed to be a smaller amount, and consequently the bad influence on the corrosion resistance and moldability of the coated metal sheet is reduced. For reference, the electrical resistivity of pure metals is in the range of $1.6 \times 10^{-6}$ Ωcm (Ag simple substance) to $185 \times 10^{-6}$ Ωcm (Mn simple substance), and it can be seen that the non-oxide ceramic used as the electrically conductive particle in the present invention (electrical resistivity: $0.1 \times 10^{-6}$ to $185 \times 10^{-6}$ Ωcm) has excellent electrical conductivity at a level substantially equal to that of pure metals.

Examples of the non-oxide ceramic that can be used in the present invention include the following. That is, examples of the boride ceramic include a boride of each transition metal of groups IV (Ti, Zr, and Hf), V (V, Nb, and Ta), and VI (Cr, Mo, and W) of the periodic table, Mn, Fe, Co, Ni, a rare earth element, and an alkaline earth metal (Ca, Sr, and Ba) other than Be or Mg.

Some borides of Be having an electrical resistivity at 25° C. of more than $185 \times 10^{-6}$ Ωcm (e.g., $Be_2B$, $BeB_6$, etc.) are not suitable for use in the present invention because the electrical conductivity is not sufficient. Further, borides of Mg ($Mg_3B_2$, $MgB_2$, etc.) are not suitable for use in the present invention because they are unstable to water and acid.

Examples of the carbide ceramic include a carbide of each transition metal of groups IV, V, and VI, Mn, Fe, Co, and Ni. Carbides of rare earth elements and alkaline earth metals (e.g., $YC_2$, $LaC_2$, $CeC_2$, $PrC_2$, $Be_2C$, $Mg_2C_3$, $SrC_2$, etc.) that may be hydrolyzed in a moist atmosphere are not suitable for use in the present invention.

Examples of the nitride ceramic include a nitride of each transition metal of groups IV, V, and VI, Mn, Fe, Co, and Ni. Nitrides of rare earth elements and alkaline earth metals (e.g., LaN, $Mg_3N_2$, $Ca_3N_2$, etc.) that may be hydrolyzed in a moist atmosphere are not suitable for use in the present invention. Examples of the silicide ceramic include a silicide of each transition metal of groups IV, V, and VI, Mn, Fe, Co, and Ni. Silicides of rare earth elements and alkaline earth metals (e.g., LaSi, $Mg_2Si$, $SrSi_2$, $BaSi_2$, etc.) that may react with water to produce hydrogen in a moist atmosphere are not suitable for use in the present invention. Further, examples include a mixture of two or more selected from these borides, carbides, nitrides, and silicides, a cermet obtained by mixing these ceramics with a metal bonding material and performing sintering, and the like.

In the case of producing the coating film (α) out of a water-based coating composition, the standard electrode potential of the metal constituting a part of the cermet is preferably −0.3 V or more to provide water degradation resistance. This is because, in the case where the standard electrode potential of the metal constituting a part of the cermet is less than −0.3 V, when the cermet particle exists in the water-based coating composition for a long period of time, a rust layer or a thick oxide insulating layer may be produced on the surface of the particle and the electrical conductivity of the particle may be lost. Examples of the water degradation resistant cermet particle include WC-12Co, WC-12Ni, TiC-20TiN-15WC-10Mo$_2$C-5Ni, and the like. The standard electrode potentials of Co and Ni are −0.28 V and −0.25 V, respectively, both of which are nobler than −0.3 V, and both metals are resistant to water degradation.

Among the non-oxide ceramics mentioned above, Cr-based ceramics (CrB, $CrB_2$, $Cr_3C_2$, $Cr_2N$, CrSi, etc.) have a concern about environmental burdens, and Hf-based ceramics ($HfB_2$, HfC, HfN, etc.) and most of the ceramics based on rare earth elements on the heavier rare earth side than Tb are expensive and are not commercially available; hence, in the present invention it is preferable to use a non-oxide ceramic other than these among the group mentioned above, or a mixture of two or more selected from these picked out ceramics.

Further, from the viewpoints of the presence or absence of industrial products, stable distribution on home and abroad markets, prices, electrical resistivity, etc., the following non-oxide ceramics are more preferable. That is, it is preferable to use $BaB_6$ (electrical resistivity: $77 \times 10^{-6}$ Ωcm), $CeB_6$ (the same: $30 \times 10^{-6}$ Ωcm), $Co_2B$ (the same: $33 \times 10^{-6}$ Ωcm), CoB (the same: $76 \times 10^{-6}$ Ωcm), FeB (the same: $80 \times 10^{-6}$ Ωcm), $GdB_4$ (the same: $31 \times 10^{-6}$ Ωcm), $GdB_6$ (the same: $45 \times 10^{-6}$ Ωcm), $LaB_4$ (the same: $12 \times 10^{-6}$ Ωcm), $LaB_6$ (the same: $15 \times 10^{-6}$ Ωcm), $Mo_2B$ (the same: $40 \times 10^{-6}$ Ωcm), MoB (the same: $35 \times 10^{-6}$ Ωcm), $MoB_2$ (the same: $45 \times 10^{-6}$ Ωcm), $Mo_2B_5$ (the same: $26 \times 10^{-6}$ Ωcm), $Nb_3B_2$ (the same: $45 \times 10^{-6}$ Ωcm), NbB (the same: $6.5 \times 10^{-6}$ Ωcm), $Nb_3B_4$ (the same: $34 \times 10^{-6}$ Ωcm), $NbB_2$ (the same: $10 \times 10^{-6}$ Ωcm), $NdB_4$ (the same: $39 \times 10^{-6}$ Ωcm), $NdB_6$ (the same: $20 \times 10^{-6}$ Ωcm), $PrB_4$ (the same: $40 \times 10^{-6}$ Ωcm), $PrB_6$ (the same: $20 \times 10^{-6}$ Ωcm), $SrB_6$ (the same: $77 \times 10^{-6}$ Ωcm), TaB (the same: $100 \times 10^{-6}$ Ωcm), $TaB_2$ (the same: $100 \times 10^{-6}$ Ωcm), TiB (the same: $40 \times 10^{-6}$ Ωcm), $TiB_2$ (the same: $28 \times 10^{-6}$ Ωcm), VB (the same: $35 \times 10^{-6}$ Ωcm), $VB_2$ (the same: $150 \times 10^{-6}$ Ωcm), $W_2B_5$ (the same: $80 \times 10^{-6}$ Ωcm), $YB_4$ (the same: $29 \times 10^{-6}$ Ωcm), $YB_6$ (the same: $40 \times 10^{-6}$ Ωcm), $YB_{12}$ (the same: $95 \times 10^{-6}$ Ωcm), $ZrB_2$ (the same: $60 \times 10^{-6}$ Ωcm), MoC (the same: $97 \times 10^{-6}$ Ωcm), $Mo_2C$ (the same: $100 \times 10^{-6}$ Ωcm), $Nb_2C$ (the same: $144 \times 10^{-6}$ Ωcm), NbC (the same: $74 \times 10^{-6}$ Ωcm), $Ta_2C$ (the same: $49 \times 10^{-6}$ Ωcm), TaC (the same: $30 \times 10^{-6}$ Ωcm), TiC (the same: $180 \times 10^{-6}$ Ωcm), $V_2C$ (the same: $140 \times 10^{-6}$ Ωcm), VC (the same: $150 \times 10^{-6}$ Ωcm), WC (the same: $80 \times 10^{-6}$ Ωcm), $W_2C$ (the same: $80 \times 10^{-6}$ Ωcm), ZrC (the same: $70 \times 10^{-6}$ Ωcm), $Mo_2N$ (the same: $20 \times 10^{-6}$ Ωcm), $Nb_2N$ (the same: $142 \times 10^{-6}$ Ωcm), NbN (the same: $54 \times 10^{-6}$ Ωcm), ScN (the same: $25 \times 10^{-6}$ Ωcm), $Ta_2N$ (the same: $135 \times 10^{-6}$ Ωcm), TiN (the same: $22 \times 10^{-6}$ Ωcm), ZrN (the same: $14 \times 10^{-6}$ Ωcm), $CoSi_2$ (the same: $18 \times 10^{-6}$ Ωcm), $Mo_3Si$ (the same: $22 \times 10^{-6}$ Ωcm), $Mo_5Si_3$ (the same: $46 \times 10^{-6}$ Ωcm), $MoSi_2$ (the same: $22 \times 10^{-6}$ Ωcm), $NbSi_2$ (the same: $6.3 \times 10^{-6}$ Ωcm), $Ni_2Si$ (the same: $20 \times 10^{-6}$ Ωcm), $Ta_2Si$ (the same: $124 \times 10^{-6}$ Ωcm), $TaSi_2$ (the same: $8.5 \times 10^{-6}$ Ωcm), TiSi (the same: $63 \times 10^{-6}$ Ωcm), $TiSi_2$ (the same: $123 \times 10^{-6}$ Ωcm), $V_5Si_3$ (the same: $115 \times 10^{-6}$ Skin), $VSi_2$ (the same: $9.5 \times 10^{-6}$ Ωcm), $W_3Si$ (the same: $93 \times 10^{-6}$ Ωcm), $WSi_2$ (the same: $33 \times 10^{-6}$ Ωcm), ZrSi (the same: $49 \times 10^{-6}$ Ωcm), or $ZrSi_2$ (the same: $76 \times 10^{-6}$ Ωcm), or a mixture of two or more selected from these.

Among these, non-oxide ceramics of which the electrical resistivity at 25° C. is in the range of $0.1 \times 10^{-6}$ to $100 \times 10^{-6}$ Ωcm are particularly preferable. This is because these have higher electrical conductivity than non-oxide ceramics having an electrical resistivity at 25° C. in the range of more than $100 \times 10^{-6}$ Ωcm up to $185 \times 10^{-6}$ Ωcm; therefore, the amount of particles added to provide the resin coating film with sufficient electrical conductivity is allowed to be smaller, thus only a limited number of conduction paths of corrosion current that penetrate through the coating film are formed, and consequently corrosion resistance is hardly reduced. In addition, this is because, due to the limited amount of particles added, the peeling and galling of the coating film are not brought about during press molding and moldability is hardly reduced.

The electrical resistivities additionally written in the parentheses of the non-oxide ceramics mentioned above are representative values (literature values) of those on the market and in use as industrial materials. These electrical resistivities increase or decrease with the type and amount of impurity elements that have entered the crystal lattice of the non-oxide ceramic; hence, in the present invention these materials may be used after checking that the electrical resistivity is in the range of $0.1 \times 10^{-6}$ to $185 \times 10^{-6}$ Ωcm by, for example, actually measuring the electrical resistivity at 25° C. using the four-terminal four-probe method and the constant current application system in accordance with JIS K7194, using a resistivity meter Loresta EP (MCP-T360 type) and ESP probes (the diameter of the flat head portion of the terminal: 2 mm) manufactured by Mitsubishi Chemical Analytech Co., Ltd.

The shape of the particle of the electrically conductive pigments (B) is preferably a shape close to a sphere, such as a spherical particle or a quasi-spherical particle (e.g., an ellipsoidal shape, a hen's egg-like shape, a rugby ball-like shape, etc.) and a polyhedral particle (e.g., a soccer ball-like shape, a die-like shape, brilliant cut shapes of various jewels, etc.). Particles of a long, thin shape (e.g., a bar-like shape, a needle-like shape, a fibrous shape, etc.) and a planar shape (e.g., a flake-like shape, a flat sheet-like shape, a thin leaf-like shape, etc.) are not suitable for use in the present invention because, in the coating process, they may be arranged parallel to the surface of the coating film or be deposited near the interface between the metal sheet (in the case where underlayer treatment is performed on the metal surface, the underlayer treatment layer) that is the substrate for coating and the coating film, and this makes it difficult to form an effective current path penetrating in the thickness direction of the coating film.

The average particle diameter of the electrically conductive pigments (B) is not particularly limited; but the pigments are preferably present in the form of particles with a volume average diameter of 0.2 to 20 μm, more preferably present in the form of particles with a volume average diameter of 0.5 to 12 μm, and particularly preferably present in the form of particles with a volume average diameter of 1 to 8 μm in the coating composition (β) of the present invention. The dispersed particle having a volume average diameter in the above range may be either a single particle or a secondary particle in which a plurality of single particles are strongly aggregated as long as they stably exist in the coating composition (β) during the production process, storage, and transportation of the coating composition (β), in the process of application to the metal sheet that is the substrate for coating (in the case where underlayer treatment is performed on the metal surface, the underlayer treatment layer), or in other like events. In the process of the application of the coating composition to the substrate, it is possible for the (B) particles to be aggregated and for the volume average diameter in the coating film to be increased during the drying of the coating film and film production.

The volume average diameter herein refers to the average diameter on a volumetric basis found from volume distribution data of particles. This may be found using any commonly known particle diameter distribution measurement method, and it is preferable to use the average value of a sphere volume-equivalent diameter distribution measured by the Coulter method (the aperture electrical resistance method). This is because the Coulter method has little difference in measurement value between manufacturers and types of the measuring apparatus, and can make accurate, high precision measurement as compared to other particle diameter distribution measurement methods (for example, (a) calculation from a volume distribution obtained by the laser diffraction scattering method, (b) conversion of a circle area-equivalent diameter distribution obtained by the image analysis method to a volume distribution, (c) calculation from a mass distribution obtained by the centrifugal sedimentation method, etc.). In the Coulter method, test particles are suspended in an electrolyte aqueous solution, a fixed current is passed through an aperture of a glass tube, and negative pressure is set so that particles are made to pass through the aperture. When a particle passes through the aperture, the electrical resistance of the aperture is increased due to the volume of the electrolyte aqueous solution that is forced out by the particle (=the volume of the particle). When a fixed current is applied, the resistance change at the time of the passage of the particle is reflected in the voltage pulse change; thus, the volume of the individual particle can be directly measured by measuring the height of the voltage pulse for each particle. Since particles have irregular shapes in many cases, a spherical body with the same volume as the particle is imaginarily set, and the particle size is converted to the diameter of the spherical body (=sphere volume-equivalent diameter). Such a method for measuring the sphere volume-equivalent diameter by the Coulter method is well known; for example, details are described in the literature of a web page on the official Internet site of Beckman Coulter, Inc., [http://www.beckmancoulter.co.jp/product/product03/Multisizer3.html (Multisizer 3, a precise particle size distribution measuring apparatus)].

Non-oxide ceramic particles with a volume average diameter less than 0.2 μm are generally more expensive than non-oxide ceramic particles with a volume average diameter higher than that, and are not distributed much on markets as industrial products. Furthermore, since the specific surface area is relatively large, when preparing a water-based or organic solvent-based coating composition, it is difficult to disperse particles while wetting the entire surface of the particle, even using a moisture dispersant, and undissolved lumps or unmixed-in lumps not compatible with water or organic solvents occur in many cases; hence, it is preferable not to use the above-mentioned particles in the present invention. Further, non-oxide ceramic particles with a volume average diameter more than 20 μm are likely to sediment faster in a water-based or organic solvent-based coating composition than non-oxide ceramic particles with a volume average diameter smaller than that (as is clear from the Stokes equation). Therefore, it is difficult to ensure dispersion stability, even when the dispersant is modified, and troubles such as an event in which particles do not float but sediment in a short time, are aggregated and solidified, and are consequently difficult to re-disperse may occur; hence, it is preferable not to use the above-mentioned particles in the present invention.

In general, most electrically conductive pigments (B) available are prepared with a prescribed particle diameter by pulverizing the source material and classifying the resulting particles as necessary, and therefore have a particle diameter distribution in which particles with different particle diameters are mixed. Therefore, even when the volume average diameter is within the particle diameter range described above, weldability is influenced depending on the particle diameter distribution. Among the examples of the electrically conductive pigments (B), particularly (B1) in which the volume particle diameter of each particle is 0.25 to 24 µm exhibits effect for good weldability.

The amount of the electrically conductive pigments (B) contained in the coating film (α) at 25° C. is preferably 0.5 to 65 volume %, more preferably 1 to 40 volume % from the viewpoints of electrical conduction capability during resistance welding, the ensuring of moldability, and cost increase due to the increase in the amount of the electrically conductive pigments, and still more preferably 2 to 20 volume %. The range of 4 to 20 volume % is particularly preferable from the viewpoints of ensuring sufficient corrosion resistance and moldability, and in addition ensuring sufficient resistance weldability.

The reason why the coating film (α) exhibits good electrical conductivity in the coated metal sheet of the present invention is presumably that, in the coating film (α), the electrically conductive pigments (B), which are electrically conductive particles, is hardly aggregated and is sufficiently uniformly dispersed over the entire surface of the coating film, and electrical conduction paths leading to the underlying metal sheet do not exist locally in the coating film. If electrically conductive particles have been aggregated in the coating film, electrical conduction paths in a state of being uniformly scattered over the entire surface of the coating film are less likely to be formed in the coating film, and an area that has no electrical conduction path and interferes with resistance welding is likely to occur in the coating film. In such a case, it is necessary to add a larger amount of electrical conductivity material in order to ensure conduction paths, and the possibility that good corrosion resistance and moldability cannot be maintained is increased. In the coated metal sheet of the present invention, the possibility of the occurrence of such a problem is very low.

If the amount of the electrically conductive pigments (B) contained in the coating film (α) is more than 65 volume %, sufficient electrical conductivity can be maintained; but the peeling and galling of the coating film are likely to occur during press molding, thus good moldability cannot be maintained, and the corrosion resistance of the part where the coating film is peeled off may be reduced. Further, if the amount is more than 65 volume %, while the effect of improving weldability is saturated, the cost of electrically conductive particles is increased.

When electrically conductive particles are added in an amount of not less than 0.5 volume % and less than 1 volume % of the coating film, electrical conduction capability during resistance welding may be insufficient; and when electrically conductive particles are added in an amount of not less than 40 volume % and not more than 65 volume % of the coating film, moldability and cost compatibility may be insufficient; thus, the volume ratio of the electrically conductive pigments (B) added is more preferably not less than 1 volume % and less than 40 volume %. Also when electrically conductive particles are added in an amount of not less than 1 volume % and less than 2 volume % of the coating film, electrical conduction capability during resistance welding may be a little insufficient; further, also when electrically conductive particles are added in an amount of not less than 20 volume % and less than 40 volume % of the coating film, moldability and cost compatibility may be a little insufficient; thus, addition in an amount of not less than 2 volume % and less than 20 volume % is still more preferable. However, when electrically conductive particles are added in an amount of not less than 2 volume % and less than 4 volume % of the coating film, there is a concern that constantly highly stable weldability cannot be ensured when the conditions of resistance welding are greatly changed; thus, addition in an amount of not less than 4 volume % and less than 20 volume % is particularly preferable.

In the case where the amount of the electrically conductive pigments (B) contained in the coating film (α) is less than 0.5 volume %, good electrical conductivity cannot be ensured because the amount of non-oxide ceramic particles dispersed in the coating film is small, and there is a concern that the coating film cannot be provided with sufficient resistance weldability, depending on the thickness of the coating film (α).

<Anti-Corrosion Pigments (C)>

The type of the anti-corrosion pigments (C) used in the present invention is not particularly limited, but is preferably one containing one or more selected from a silicate compound, a phosphate compound, a vanadate compound, and metal oxide fine particles.

A silicate compound, a phosphate compound, and a vanadate compound can, in the coating composition (β) or the coating film (α), release a silicate ion, a phosphate ion, and a vanadate ion, and counter-cations of these anions (e.g., an alkaline earth metal ion, a Zn ion, an Al ion, etc.), respectively, in accordance with the environmental change of water in the composition or the coating film, contact with a coexisting substance or the substrate surface, pH, etc. It is presumed that, of these ions, the ions that have already been dissolved out in the coating composition (β) are incorporated into the coating film (α) during film production; and in accordance with the increase or decrease in the amount of water in the coating film, contact with a coexisting substance or the substrate surface, pH change, etc., the ions form a covering film of an insoluble salt or oxide together with another coexisting atom or atomic group, and thus suppress corrosion. Similarly, it is presumed that, in accordance with the environmental change after coating film formation, also the silicate compound, the phosphate compound, and the vanadate compound incorporated in the coating film (α) gradually release the anion and cation mentioned above and form a covering film of an insoluble salt or oxide, and thus suppress corrosion. Also in the case where the coating film is flawed and the plating film of the metal sheet or the underlayer metal below the plating is exposed, the action mentioned above is brought out by silicate ions, phosphate ions, and vanadate ions, and counter-cations of these anions being released and arriving at the exposed surface of the plating film or the underlayer metal. The action is exhibited more effectively in the case where the degree of flawing is suppressed to a low level and the exposed area of the plating film or the underlayer metal is limited to a low level.

Examples of the silicate compound that can be used in the present invention include a silicate of an alkaline earth metal such as magnesium silicate and calcium silicate, a silicate of an alkali metal such as lithium silicate, sodium silicate, and potassium silicate, aluminum silicate, and the like. Of these, examples of the lithium silicate, the sodium silicate, and the potassium silicate include a lithium silicate in which the composition molar ratio between silicon oxide ($SiO_2$) and lithium oxide ($Li_2O$) is $0.5 \leq (SiO_2/Li_2O) \leq 8$, a sodium silicate in which the composition molar ratio between silicon oxide ($SiO_2$) and sodium oxide ($Na_2O$) is $0.5 \leq (SiO_2/Na_2O) \leq 4$, and a potassium silicate in which the composition molar ratio between silicon oxide ($SiO_2$) and potassium oxide ($K_2O$) is $0.5 \leq (SiO_2/K_2O) \leq 4$, and a hydrate of these silicates. Specific examples of these include lithium orthosilicate ($Li_4SiO_4$; $2Li_2O.SiO_2$), hexalithium diorthosilicate ($Li_6Si_2O_7$; $3Li_2O.2SiO_2$), lithium metasilicate ($Li_2SiO_3$;

Li$_2$O.SiO$_2$), lithium disilicate (Li$_2$Si$_2$O$_5$; Li$_2$O.2SiO$_2$), tetralithium heptasilicate (2Li$_2$O.7SiO$_2$), lithium tetrasilicate (Li$_2$Si$_4$O$_9$; Li$_2$O.4 SiO$_2$), tetralithium nonasilicate (2Li$_2$O.9SiO$_2$), tetralithium pentadecasilicate (2Li$_2$O.15 SiO$_2$), sodium orthosilicate (Na$_4$SiO$_4$; 2Na$_2$O.SiO$_2$), sodium metasilicate (Na$_2$SiO$_3$; Na$_2$O.SiO$_2$), sodium disilicate (Na$_2$Si$_2$O$_5$; Na$_2$O.2SiO$_2$), sodium tetrasilicate (Na$_2$Si$_4$O$_9$; Na$_2$O.4SiO$_2$), potassium orthosilicate (K$_4$SiO$_4$; 2K$_2$O.SiO$_2$), potassium metasilicate (K$_2$SiO$_3$; K$_2$O.SiO$_2$), potassium disilicate (K$_2$Si$_2$O$_5$; K$_2$O.2SiO$_2$), and potassium tetrasilicate (K$_2$Si$_4$O$_9$; K$_2$O.4SiO$_2$), and a hydrate of these silicates. Most of the hydrates of these silicates easily turn into a gel in a hydrated state as it is due to the environmental change of pH, temperature, etc., and part of them may turn into a macromolecule to form a polysilicate. Also such a polysilicate is included in the silicate compound that can be used in the present invention.

Examples of the phosphate compound that can be used in the present invention include a metal salt of orthophosphoric acid, polyphosphoric acid (the simple substances of linear polymers in which the degree of polymerization of orthophosphoric acid is up to 6, or a mixture of two or more of these), metaphosphoric acid (the simple substances of cyclic polymers in which the degree of polymerization of orthophosphoric acid is 3 to 6, or a mixture of two or more of these), tetrametaphosphoric acid, hexametaphosphoric acid, and the like, a phosphate mineral such as phosphorus pentoxide, monetite, triphylite, whitlockite, xenotime, stercorite, struvite, and vivianite, a commercially available composite phosphate pigments such as silica polyphosphate and a tripolyphosphate, and a metal salt of phytic acid, phosphonic acid (phosphorous acid), phosphinic acid (hypophosphoric acid), and the like, a mixture of two or more of these, and the like. The orthophosphate herein includes a monohydric salt (HPO$_4^{2-}$) and a dihydric salt (H$_2$PO$_4^-$) of orthophosphoric acid. Further, the polyphosphate includes a hydric salt. The type of the cation for forming the phosphate is not particularly limited; examples include a metal ion of Co, Cu, Fe, Mn, Nb, Ni, Sn, Ti, V, Y, Zr, Al, Ba, Ca, Mg, Sr, Zn, and the like, and an oxocation such as vanadyl, titanyl, and zirconyl; and Al, Ca, Mg, Mn, and Ni are preferably used. The phosphate compounds mentioned above may be used singly or in combination of two or more.

It is not preferable to use a large amount of an alkali metal as the type of the cation for forming the phosphate. In the case where a phosphate of an alkali metal is used, a product obtained by firing in an industrial production process tends to be dissolved in water excessively. However, a phosphate of an alkali metal may be used in a slightly larger amount when the solubility in water can be controlled during the production of the anti-corrosion pigments, the production of the coating composition, the production of a film on the metal sheet, the use of the coated metal sheet, etc. Examples of such control include a method in which an anti-corrosion pigments are made to coexist with another additive that restrains the solubility in water or made to coexist with a resin-based or inorganic-based macromolecule that is cross-linked to a high degree, and the rate of dissolving-out in water is controlled, and the like.

The vanadate compound that can be used in the present invention is a compound in which the valence of vanadium is one of 0, 2, 3, 4, and 5 or a composite compound having two or more of these valences, and examples include an oxide, a hydroxide, an oxyacid salt of various metals, a vanadyl compound, a halide, a sulfate, a metal powder, etc. of vanadium having the above valences. These decompose during heating or in the presence of water, and react with coexisting oxygen. For example, a metal powder or a divalent compound of vanadium changes to a compound with a valence of one of 3, 4, and 5 in the end. A zero-valent compound, for example vanadium metal powder, can be used for the reason mentioned above, but has a problem such as oxidation reaction being insufficient and is therefore not preferable in practical terms. A pentavalent vanadium compound has a vanadate ion, and is likely to react with a phosphate ion by heating to form a heteropolymer that contributes to rust resistance; thus, containing a pentavalent vanadium compound as a component is preferable. Specific examples of the vanadium compound include a vanadium (II) compound such as vanadium(II) oxide and vanadium(II) hydroxide, a vanadium(III) compound such as vanadium (III) oxide, a vanadium(IV) compound such as vanadium (IV) oxide and a vanadyl halide, and a vanadium(V) compound such as vanadium(V) oxide and a vanadate (an orthovanadate, a metavanadate, and a pyrovanadate of various metals, etc.), and a mixture thereof. The preferred type of metal for forming the vanadate is the same as the metals described for the phosphate.

In the case where a vanadate of an alkali metal is used, a product obtained by firing in an industrial production process tends to be dissolved in water excessively; thus, like in the case of the phosphate, it is not preferable to use a large amount of a vanadate of an alkali metal. However, these may be used when the solubility in water can be controlled, like in the case where a phosphate of an alkali metal is used. This similarly applies to the cases of a halide and a sulfate of vanadium.

In the coated metal sheet of the present invention, the total amount of the silicate compound, the phosphate compound, and the vanadate compound mentioned above is 1 to 40 volume %, preferably 1 to 20 volume %, and more preferably 2 to 15 volume % of the coating film ($\alpha$). If the total amount is less than 1 volume %, the action of the silicate compound, the phosphate compound, and the vanadate compound is insufficient, and therefore corrosion resistance may be reduced. If the total amount is more than 20 volume %, the coating film is embrittled; hence, by the cohesion failure of the coating film, the adhesiveness and followability of the coating film during shaping may be reduced and weldability may be reduced.

The anti-corrosion pigments (C) preferably contain one or more of a silicate compound, a phosphate compound, and a vanadate compound, and more preferably has a composition in which a phosphate compound (a phosphate ion source) and at least one of a silicate compound (a silicate ion source) and a vanadate compound (a vanadate ion source) coexist, in terms of enhancing the antirust effect. The blending ratio between the amount of the phosphate ion source and the total amount of the silicate ion source and the vanadate ion source is preferably set to [the number of moles of P$_2$O$_5$]:[the total number of moles of SiO$_2$ and V$_2$O$_5$] being 25:75 to 99:1. If the molar ratio of the total amount of the silicate ion source and the vanadate ion source to the total amount of the phosphate ion source, the silicate ion source, and the vanadate ion source is more than 75%, the antirust effect by phosphate ions may be reduced; and if the molar ratio of the total amount of the silicate ion source and the vanadate ion source is smaller than 1%, the effect of oxidizing and fixing neighboring chemical components by silicate ions (or vanadate ions) may be insufficient.

Other than the above, metal oxide fine particles made of one or more metal elements selected from the group consisting of Si, Ti, Al, and Zr may be used as the anti-corrosion pigments (C) used in the present invention. These metal oxide fine particles may be used singly, or may be blended together with a silicate compound, a phosphate compound, and a vanadate compound; thereby, corrosion resistance can further be enhanced. When a silicate compound, a phosphate compound, and a vanadate compound, and silica coexist, corrosion resistance is improved even more; thus, this is preferable. Examples of the silica include fumed silica, colloidal silica, aggregated silica, etc. Also calcareous silica may be used.

Examples of the metal oxide fine particles mentioned above that can be used in the present invention include silica fine particles, alumina fine particles, titania fine particles, zirconia fine particles, and the like in which the volume average diameter is approximately 0.2 to 10 μm; and metal oxide fine nanoparticles in which the volume average diameter is approximately 0.5 to 30 nm are more preferable. These may be used singly, or may be used in combination of two or more. Among these, silica fine nanoparticles may be added in the case where both the improvement in corrosion resistance and the toughening of the coating film are needed.

As the metal oxide fine nanoparticles with a particle diameter of not less than 0.5 nm and less than 30 nm, for example, colloidal silica, colloidal titania, and colloidal zirconia may be used. These are produced by a different method from the metal oxide mentioned above that is prepared in a fine particle form by pulverization, and are therefore easily dispersed in the coating material and in the coating film of the coated metal member after coating, while having a particle diameter of fine primary particles (0.5 nm to 30 nm) as they are. These metal oxide fine nanoparticles have higher antirust effect than metal oxide fine particles of the same composition having a larger particle diameter. However, such metal oxide fine nanoparticles may inhibit weldability in energization resistance welding in which a current is passed while a load is applied with electrodes, and the resulting Joule heat is utilized to perform welding, such as spot welding.

For the amount of metal oxide fine nanoparticles, it is preferable that the ratio of the total volume of the metal oxide fine nanoparticles in the coating film to the total volume of the non-oxide ceramic particles (B) (metal oxide fine nanoparticles/B) be 20 or less. In the case where importance is attached to weldability, the ratio is more preferably 10 or less. The lower limit of (metal oxide fine nanoparticles/B) is preferably 0.1 or more. The case where (metal oxide fine nanoparticles/B) is less than 0.1 is a state where the amount of non-oxide ceramic particles (B) in the coating film is too large, or the amount of metal oxide fine nanoparticles is too small. In the former, since the amount of non-oxide ceramic particles (B) in the coating film is too large, the coating film is embrittled, and the cracking and falling off of the coating film during shaping may occur. The cracking and falling off of the coating film lead to a reduction in corrosion resistance provided by the coating film and a defective external appearance of the coated metal sheet. In the latter, since the amount of metal oxide fine nanoparticles in the coating film is insufficient, the effect of enhancing corrosion resistance may not be obtained sufficiently. The rust resistance that is reduced by suppressing the amount of metal oxide fine nanoparticles in order to ensure weldability can be compensated for by adding anti-corrosion pigments (C) with a particle diameter of 100 nm or more. The anti-corrosion pigments (C) with a particle diameter of 100 nm or more are less likely to get between an electrode and (B), between (B) and (B), or between (B) and the metal sheet in a state where the coating film is applied on the metal sheet or a state where the coating film is deformed by the load applied by the welding electrodes, and therefore has little bad influence on energization resistance welding as compared to metal oxide fine nanoparticles.

It is preferable that the amount of the anti-corrosion pigments (C) be 1 to 40 volume % of the coating film (α) and that the total amount of the anti-corrosion pigments (C) and the electrically conductive pigments (B) not exceed 80 volume %. In the case where importance is attached to the corrosion resistance of the coated metal sheet, the amount of the anti-corrosion pigments (C) is more preferably 3 to 40 volume %, and still more preferably 7.5 to 40 volume %. In the case where importance is attached to achieving even more corrosion resistance of the coated metal sheet, the amount of the anti-corrosion pigments (C) is more preferably 13 to 40 volume %. If the amount is less than 1 volume %, the amount of the anti-corrosion pigments (C) is insufficient, and therefore the effect of enhancing corrosion resistance may not be obtained sufficiently. If the amount is more than 40 volume %, the coating film may be embrittled and the adhesiveness of the coating film to the metal sheet may be reduced; consequently, the metal sheet may be exposed due to the breaking and peeling of the coating film during shaping, and the external appearance of the coated metal sheet may be degraded and the effect of improving corrosion resistance provided by the coating film may be reduced.

The amount of the electrically conductive pigments (B) and the amount of the anti-corrosion pigments (C) can be calculated by observing a cross section of the coating film with an electron microscope to identify each particle, counting the number of particles per cross section, and converting the resulting number to the number per volume of the coating film. In this case, each particle may be identified using an EDX spectrometer or the like, as necessary. It is also possible to calculate the amount of particles in the coating film from the amounts of (B) and (C) contained in the coating material before coating and the amount of the coating film attached to the metal sheet. When the amounts of (B) and (C) incorporated in the coating material before coating have been found, the amount of particles in the coating film can be calculated from the amounts of incorporation and the amount of the coating material attached to the metal sheet. When the amounts of incorporation are unknown, calculation may be made by, for example, identifying and counting individual particles in a coating material that have been diluted to an appropriate concentration, using image analysis with an apparatus such as Morphologi G3, a particle image analyzer manufactured by Malvern Instruments Ltd. This method may be used also in the case where the coating film attached to the metal sheet is dissolved and the number of particles is counted. However, based on the fact that the calculation values of the amount of the electrically conductive pigments (B) and the amount of the anti-corrosion pigments (C) in the coating film (α) obtained by calculation based on the blending ratio between the organic resin (A), the electrically conductive pigments (B), and the anti-corrosion pigments (C) and the specific gravities of them after drying are expected to be values close to the measurement values obtained by cross-sectional observation, also a method of performing calculation simply from the blending ratio is possible.

The various anti-corrosion pigments mentioned above are introduced into the organic resin (A) in the coating film (α) preferably by dissolving, or dispersing and stabilizing a suitable amount of the anti-corrosion pigments in the coating composition (β) in advance.

<Particles (D)>

In addition to the electrically conductive pigments (B) and the anti-corrosion pigments (C), particles (D) such as granular wax or resin beads in which the Martens hardness at 40° C. is 200 mg/mm² to 200,000 mg/mm² may be contained as particles in the coating film of the present invention. The granular wax and the resin beads with a Martens hardness at 40° C. of 200 mg/mm² to 200,000 mg/mm² may be arbitrarily selected in view of the ease of addition to the coating material, etc. Examples include polyolefin wax, polyethylene wax, polypropylene wax, polybutylene wax, modified polyolefin wax, acrylic resin particles, silicon resin particles, fluorine resin particles, a polyacrylonitrile resin, and the like.

In the case where the Martens hardness at 40° C. of the particles (D) is less than 200 mg/mm², when surfaces of coated metal sheets of the present invention come into contact with each other or the surface of the coated metal sheet comes into contact with another material, instrument, or tool, the effect of particles (D) coming into contact more preferentially than the resin (A) and thereby preventing the coating film ($\alpha$) from adhering to or melting with them is small. It is difficult to industrially find particles (D) with a Martens hardness at 40° C. of more than 200,000 mg/mm², and this value practically serves as the upper limit of HM. The range of the Martens hardness is more preferably not less than 300 mg/mm² and not more than 2000 mg/mm².

Particles that are selected from the electrically conductive pigments (B), the anti-corrosion pigments (C), and the particles (D) mentioned above and have a diameter of the primary particle of 1 μm to 10 μm are defined as particles (P). The particles (P) are composed of at least one of the electrically conductive pigments (B) and the anti-corrosion pigments (C), and may include particles (D) as necessary.

The exposure state and the particle diameter of the particles (P) can be found by microscopic observation from above the coated metal sheet or the microscopic observation of a cross section of the coated metal sheet. Also the density of exposed particles (P) can be found by observation from above the coated metal sheet. Alternatively, when the particle diameter and the number of particles of the source material of the particles (P) are known, the density may be calculated from the amount of blending in the coating material. The particles (P) exposed on the surface of the coating film ($\alpha$) have a Martens micro-hardness HM at 40° C. of 200 to 200,000 (mg/mm²), and constitute at least part of the surface of the coating film ($\alpha$). According to the investigation by the inventors, the particles (P) exposed on the surface of the coating film ($\alpha$) are less likely to deform than the resin (A) forming the coating film ($\alpha$); therefore, when surfaces of coated metal sheets of the present invention come into contact with each other or the surface of the coated metal sheet comes into contact with another material, instrument, or tool, particles (P) come into contact more preferentially than the coating film ($\alpha$), and can thereby prevent the coating film ($\alpha$) from adhering to or melting with them.

Figure 7:
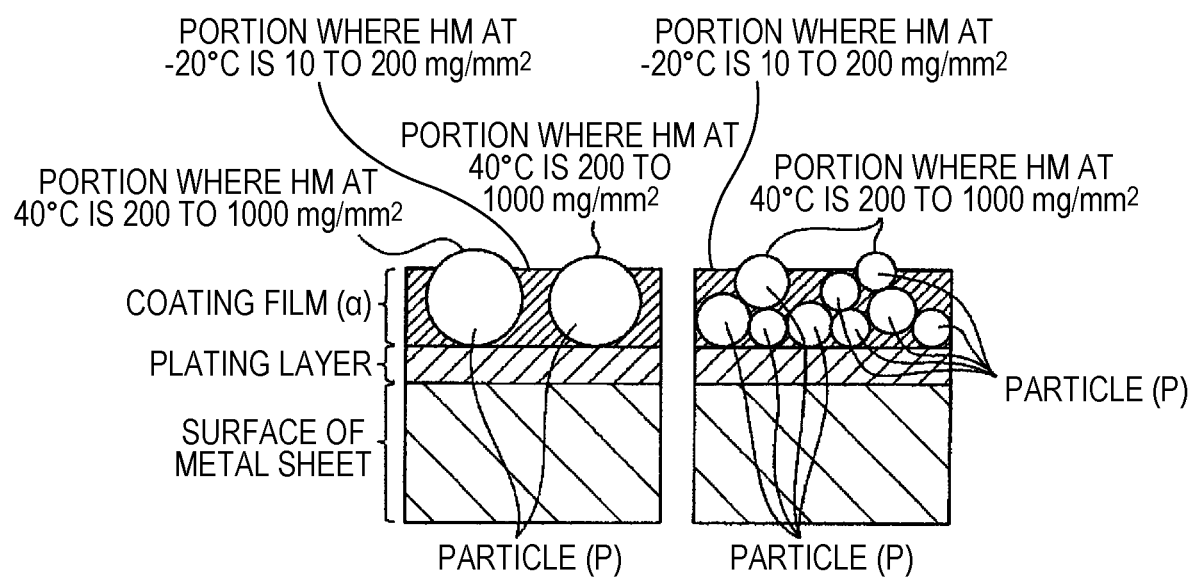
FIG. 7 shows a schematic diagram showing states of distribution of particles (P) in a cross section of a coated metal sheet for automobile of the present invention.

FIG. 7 shows a state where particles (P) are exposed from the coating film (a), as a schematic diagram. In order for particles (P) to come into contact with another material more preferentially than the coating film ($\alpha$), it is preferable that the relationship between the thickness (T) of the coating film after drying and the particle diameter (R) of the particle (P) satisfy the following formula:

$T/R$=0.6 to 2.5

(where R represents the volume average particle diameter (μm) of the particle P). If T/R is less than 0.6, most part of the individual particle (P) protrudes from the coating film ($\alpha$); therefore, particles (P) are likely to fall off and the particles (P) do not exhibit the effect sufficiently, or the particles (P) that have fallen off are likely to get mixed in the process and cause a problem with quality; hence, this is not preferable. If T/R is more than 2.5, the exposure of particles (P) from the coating film ($\alpha$) is insufficient, and the effect of preventing adhesion or melting is low; hence, this is not preferable.

The effect was found to be significant in the case where the diameter of the primary particle of the particles (P) was 1 μm to 10 μm and the exposure density was 100 to $2.0\times10^6$/mm². The case where the exposure density is $1.0\times10^3$ to $2.0\times10^5$/mm² is preferable, and the case where the exposure density is $5.0\times10^3$ to $2.0\times10^4$/mm² is more preferable. In the case where the diameter of the primary particle is less than 1 μm, particles (P) are buried in the coating film ($\alpha$), and therefore it is difficult to bring out the action of particles (P) coming into contact preferentially. In the case where the diameter of the primary particle is more than 10 μm, it is difficult for particles (P) to stably exist in the coating material for forming the coating film ($\alpha$), and the economical efficiency of the storage of the coating material and coating is poor. In the case where the exposure density of particles (P) is less than 100/mm², the density is too low, and therefore it is difficult to bring out the action of particles (P) coming into contact preferentially. In the case where the amount is large enough for the exposure density to be more than $2.0\times10^6$/mm², the amount of particles (P) in the coating film ($\alpha$) is too large, and therefore the problems that the coating film is likely to be peeled off and that coating is difficult, etc. arise.

<Preparation of Coating Composition ($\beta$)>

The method for producing the coating composition ($\beta$) used to form the coating film ($\alpha$) of the present invention is not particularly limited. Examples include a method in which the components for forming the coating film ($\alpha$) are added into water or an organic solvent, and stirring is performed with a dispersing machine such as a disperser to perform dissolution, dispersion, or pulverization dispersion. In the case of a water-based coating composition, a known hydrophilic solvent or the like may be added in order to improve the solubility or dispersibility of the components for forming the coating film ($\alpha$), as necessary.

In particular, in the case of a water-based coating composition ($\beta$), in addition to the particles (D), various water-soluble or water dispersible additives may be added to the resin (A1), the electrically conductive pigments (B), and the anti-corrosion pigments (C) to the extent that the aqueous nature and coatability of the coating material are not impaired, as necessary. For example, various water-soluble or water dispersible antirust agents not having the form of pigments, a surfactant such as an antifoaming agent, an anti-setting agent, a leveling agent, and a moisture dispersant, a thickener, a viscosity modifier, etc. may be added. Further, for the purposes of the stabilization of constituent components of the coating composition ($\beta$) such as a resin or another organic compound etc., a small amount of an organic solvent may be added to the extent that it does not fall under the organic solvents etc. (class 1 organic solvents, class 2 organic solvents, or class 3 organic solvents, or materials containing more than 5 mass % of the organic solvent mentioned above) defined in Enforcement Ordinance of Industrial Safety and Health Law (Ordinance on the Prevention of Organic Solvent Poisoning, Chapter 1, Section 1).

In the case where the coating film (α) of the present invention is formed of a water-based coating composition (β), because of the water-based properties, the surface tension is high as compared to organic solvent-based coating compositions; thus, the wettability to the metal sheet that is the substrate (in the case where underlayer treatment is performed, the underlayer treatment layer), the electrically conductive pigments (B), the anti-corrosion pigments (C), the particles (D), etc. is poor, and uniform coatability and particle dispersibility may not be obtained when a prescribed amount of coating is performed on the substrate. In such a case, the moisture dispersant and the thickener mentioned above may be added. As the moisture dispersant, a surfactant that reduces the surface tension may be used, and a macromolecular surfactant with a molecular weight of 2000 or more (a macromolecular dispersant) is preferably used. A low-molecular surfactant can move through the resin coating film containing moisture relatively easily, and is therefore likely to bring, to the metal surface, water adsorbed on a polar group of the surfactant and corrosion factors such as dissolved oxygen and dissolved salts coming via the water, and furthermore likely to bleed out for itself and dissolve out; consequently, often degrades the rust resistance of the coating film. In contrast, a macromolecular surfactant can adsorb on the surface of a metal, a ceramic particle, and a pigment by multipoint adsorption, and is therefore hardly detached once it is adsorbed; thus, it is effective in wettability improvement even at low concentration. In addition, molecules are voluminous, and are therefore less likely to move through the resin coating film and less likely to bring corrosion factors to the metal surface. Some of the acrylic resins of which the addition to the organic resin (A) is recommended in the item of <Organic resin (A)> mentioned above have the function of a macromolecular surfactant like the above, and have the effects of restraining the sedimentation of the electrically conductive pigments (B), the anti-corrosion pigments (C), the particles (D), etc. and uniformity dispersing them in the water-based coating composition.

A thickener may be added as a measure in the case where a moisture dispersant by itself cannot provide the repulsive portion of the substrate surface with sufficient surface covering condition or in the case where the viscosity of the water-based coating composition is too low to ensure a necessary coating film thickness. Many thickeners have a molecular weight of several thousand to several ten thousand; and molecules of a thickener adsorb on the surface of a pigment etc. by multipoint adsorption and are associated with each other to form a weak network structure, and can thus enhance the viscosity of the coating composition.

In the case where the water-based coating composition (β) contains electrically conductive pigments (B), anti-corrosion pigments (C), and particles (D) with a high specific gravity, a viscosity modifier that can provide thixotropic properties (thixotropy) may be added to the coating material, as necessary. Like in the case of the thickener mentioned above, molecules of a viscosity modifier adsorb on the surface of a pigment etc. by multipoint adsorption in the water-based coating composition, and form a network structure. The molecular weight of such a viscosity modifier is several hundred thousand to several million, which is very high, and therefore the viscosity modifier forms a strong network structure having a large yield value in the water-based coating composition (β); thus, the coating composition (β) is, at a low shear rate, less likely to deform, and has a high viscosity. When a large shear stress more than the yield value is applied to the coating composition (β), the network structure collapses and the viscosity decreases rapidly. Thus, when a viscosity modifier is added, the following effects are exhibited: during storage and transportation in which the water-based coating composition (β) generally keeps a stationary state, the viscosity of the coating composition (β) is enhanced and the sedimentation of heavy pigments is restrained; and when a high shear stress (high shear rate) is applied, such as when the composition flows through pipes in a coating factory and when the composition is applied to the substrate, the viscosity of the coating composition (β) is reduced and flowing is made easier.

In the case of an organic solvent-based coating composition (β), the coating composition in which a resin is dissolved in an organic solvent has a relatively high viscosity, and the viscosity is easy to adjust. Hence, the viscosity of the coating composition can be easily and stably maintained at 100 mPa·s or more, which is advantageous to suppress the sedimentation of pigments. Further, a non-oxide ceramic used as an electrically conductive material is a substance having also a hydrophobic part on its surface, and is therefore easily dispersed in an organic solvent-based coating composition (β), in general; therefore, coating can be performed without causing the sedimentation of the electrically conductive pigments (B) in the coating composition (β); thus, this is preferable.

When a coating composition in which the organic solvent-based coating composition (β) that forms the coating film has a viscosity of 100 to 2000 mPa·s is applied onto the metal sheet with a roll coater or a curtain coater and then drying and baking are performed, the electrically conductive pigments (B) are less likely to sediment; thus, this is more preferable. If the viscosity of the coating composition (β) is less than 100 mPa·s, the electrically conductive pigments (B) are likely to sediment; and if the viscosity is more than 2000 mPa·s, the viscosity is too high and a defective external appearance during coating commonly called ribbing or the like may be brought about. The viscosity is more preferably 250 to 1000 mPa·s. The viscosity of the organic solvent-based coating composition (β) can be measured using a Brookfield viscometer at the same temperature as the temperature of the coating composition at the time of coating with a roll coater or a curtain coater.

The viscosity can be adjusted by the type of the organic solvent used and the amount of the solvent. As the organic solvent, a known solvent may generally be used, but an organic solvent with a high boiling point is preferable. Since the baking time is short in the production line of the metal sheet of the present invention, using a solvent with a low boiling point may cause a coating defect commonly called boiling. A solvent with a boiling point of 120° C. or more is preferably used. As organic solvents with a high boiling point like the above, a known solvent such as cyclohexane or Solvesso (product name of ExxonMobile Yugen Kaisha), which is an aromatic hydrocarbon-based organic solvent, may be used.

<Formation of Coating Film (α)>

As described in the item of <Coating film (α)>, in the case where the coating composition (β) is a water-based or organic solvent-based composition, the coating film (α) of the present invention is preferably produced by a film production method in which the coating composition (β) is applied onto the metal sheet using a known coating method such as roll coating, groove roll coating, curtain flow coating, roller curtain coating, dipping, or air knife squeezing, and then the water or solvent of the wet coating film is removed to dryness. In the case of, among the above compositions, a water-based or organic solvent-based ultraviolet curable or electron beam curable composition, it is preferable to apply the composition onto the metal sheet by the coating method mentioned above, then remove the water or solvent to dryness, and apply ultraviolet light or an electron beam to perform polymerization.

A baking drying method in the case where the coating composition (β) is a water-based or organic solvent-based bake hardenable composition will now be specifically described. In the case where the coating composition (β) is a water-based or organic solvent-based bake curable composition, the baking drying method is not particularly limited; the metal sheet may be heated in advance or the metal sheet may be heated after coating, or these may be combined to perform drying. The heating method is not particularly limited; hot air, induction heating, near-infrared light, direct fire, etc. may be used singly or in combination.

In the case where the coating composition (β) is a water-based bake curable composition, the baking drying temperature is preferably 120° C. to 250° C. as the maximum heating temperature of the surface of the metal sheet. If the maximum heating temperature is less than 120° C., the curing of the coating film may be insufficient and corrosion resistance may be reduced; and if the maximum heating temperature is more than 250° C., bake curing may be excessive, and corrosion resistance and moldability may be reduced. The baking drying time is preferably 1 to 60 seconds, and more preferably 3 to 20 seconds. If the time is less than 1 second, bake curing may be insufficient, and corrosion resistance may be reduced; and if the time is more than 60 seconds, productivity may be reduced.

In the case where the coating composition (β) is an organic solvent-based bake curable composition, the maximum heating temperature of the surface of the metal sheet is preferably 180° C. to 260° C. If the maximum heating temperature is less than 180° C., the curing of the coating film may be insufficient, and corrosion resistance may be reduced; and if the maximum heating temperature is more than 260° C., bake curing may be excessive, and corrosion resistance and moldability may be reduced. The baking drying time is preferably 10 to 80 seconds, and more preferably 40 to 60 seconds. If the time is less than 10 seconds, bake curing may be insufficient, and corrosion resistance may be reduced; and if the time is more than 80 seconds, productivity may be reduced.

A film production method in the case where the coating composition (β) is a water-based or organic solvent-based ultraviolet curable or electron beam curable composition will now be specifically described. Any of these compositions is applied by a similar method to the case of the water-based or organic solvent-based composition mentioned above, then the water or solvent of the wet coating film is removed to dryness, and after that ultraviolet light or an electron beam is applied. The coating film is produced by being cured mainly from, as a starting point, radicals generated by ultraviolet or electron beam irradiation; hence, the drying temperature is allowed to be lower than in the case of a bake curable composition. Ultraviolet or electron beam irradiation is preferably performed after most of the water or solvent is volatilized in a drying process at a relatively low maximum heating temperature of the metal surface of approximately 80 to 120° C.

The ultraviolet irradiation for radically polymerizing and curing an ultraviolet curable resin in the coating film is usually performed in the air atmosphere, an inert gas atmosphere, a mixed atmosphere of the air and an inert gas, or the like. In the ultraviolet curing of the present invention, ultraviolet irradiation is performed preferably in a mixed atmosphere of the air and an inert gas in which the oxygen concentration is adjusted to 10 volume % or less or in an inert gas atmosphere. Since oxygen acts as an inhibitor of radical polymerization, in the case where the concentration of atmospheric oxygen during ultraviolet irradiation is low, deactivation and crosslinking reaction inhibition due to the addition of oxygen to the generated radicals are suppressed, and the ultraviolet curable composition used in the present invention experiences radical polymerization and crosslinking and is sufficiently tuned into macromolecules. Hence, the adhesiveness to the electrically conductive pigments (B) and the surface of the metal sheet is enhanced, and as a result the corrosion resistance of the coating film is improved over the case of ultraviolet curing in the air atmosphere. Examples of the inert gas used herein include nitrogen gas, carbon dioxide gas, and argon gas, a mixed gas thereof, and the like.

Ultraviolet light can be applied by using an ultraviolet light source such as a high pressure mercury lamp of a metal vapor discharge system, a metal halide lamp or the like, a xenon lamp or the like of a rare gas discharge system, or an electrodeless lamp using a microwave. In the coated metal sheet of the present invention, any lamp may be used as long as the ultraviolet curable coating film can be sufficiently cured and desired resistance weldability, corrosion resistance, and moldability can be obtained. In general, the peak illuminance and the integrated amount of ultraviolet light received by the coating film influence the curability of the coating film; but the conditions of ultraviolet irradiation are not particularly limited as long as the ultraviolet curable coating film can be sufficiently cured and desired corrosion resistance and moldability can be obtained.

In the case where the coating composition (β) is an electron beam curable composition, an ordinary electron beam irradiation apparatus used in the fields of printing, coating, film coating, wrapping, sterilization, etc. may be used for electron beam curing. These are an apparatus that applies a high voltage to thermoelectrons generated from a hot filament in a high vacuum to accelerate them, extracts the resulting electron current into an inert gas atmosphere, and applies the current to a polymerizable substance. In the coated metal sheet of the present invention, any apparatus may be used as long as the electron beam curable coating film can be sufficiently cured and desired resistance weldability, corrosion resistance, and moldability can be obtained. In general, the acceleration voltage of the electron beam absorbed by the coating film influences the depth to which the electron beam permeates through the coating film and the absorbed dose influences the rate of polymerization (the curability of the coating film); but the conditions of electron beam irradiation are not particularly limited as long as the electron beam curable coating film can be sufficiently cured and desired corrosion resistance and moldability can be obtained. However, in the case of radical polymerization with an electron beam, the presence of even a minute amount of oxygen causes deactivation and crosslinking reaction inhibition due to the addition of oxygen to the generated radicals, and makes curing insufficient; hence, electron beam irradiation is performed preferably in an inert gas atmosphere in which the oxygen concentration is 500 ppm or less. Examples of the inert gas used herein include nitrogen gas, carbon dioxide gas, and argon gas, a mixed gas of these, and the like.

EXAMPLES

Example I

The present invention will now be specifically described with Example I using a water-based coating composition.

1. Preparation of Metal Sheet

The following five types of zinc-based plated steel sheets were prepared, and were dipped in an aqueous solution at 40° C. containing 2.5 mass % of a water-based alkaline degreasing agent (FC-301 produced by Nihon Parkerizing Co., Ltd.) for 2 minutes to degrease the surface, and then water washing and drying were performed; thus, metal sheets for coating were formed.

EG: a zinc-electroplated steel sheet (sheet thickness: 0.8 mm; the amount of plating adhesion: 30 g/m$^2$)
ZL: a Zn-10% Ni alloy-electroplated steel sheet (sheet thickness: 0.8 mm; the amount of plating adhesion: 30 g/m$^2$)
GI: a zinc-hot-dipped steel sheet (sheet thickness: 0.8 mm; the amount of plating adhesion: 40 g/m$^2$)
SD: a Zn-11% Al-3% Mg-0.2% Si alloy-hot-dipped steel sheet (sheet thickness: 0.8 mm; the amount of plating adhesion: 40 g/m$^2$)
GA: an alloyed zinc-hot-dipped steel sheet (sheet thickness: 0.8 mm; 10% Fe; the amount of plating adhesion: 45 g/m$^2$)

2. Production of Underlayer Treatment Covering Film

As described in the item of <Coating film (α)>, in the present invention, an underlayer treatment covering film does not necessarily need to be provided between the coating film (α) and the surface of the metal sheet, but may be used in order to further improve the adhesiveness to the metal sheet, corrosion resistance, etc. of the coating film (α). Herein, part of the metal sheets for coating were provided with an underlayer treatment covering film, and evaluation was performed.

A water-based coating composition composed of a polyester resin, silica fine particles, and a silane coupling agent was prepared as the coating composition for producing the underlayer treatment covering film.

The composition mentioned above was applied to the metal sheet for coating mentioned above by bar coating so that the covering film thickness was 0.08 μm, and the workpiece was dried in a hot-air oven at a maximum heating temperature of the metal surface of 70° C. and was thus air-dried.

3. Preparation of Water-Based Coating Composition and Film Production

To prepare the water-based coating composition, first, the resin (A), the electrically conductive pigments (B), and the anti-corrosion pigments (C) were prepared.

(1) Resin (A1)

Commercially available resins A1 to A8 shown in Table 1 were prepared as resins for Examples (Invention Examples) and Comparative Examples.

TABLE 1

|  | Organic resin A | Name and production method of resin | −80~−20° C. Tg | 10~200 HM at −20° C. | Manufacturer | Note |
|---|---|---|---|---|---|---|
| Example | A1 | UCOAT UX340 | −50 | 100 | Sanyo Chemical Industries, Ltd. | Urethane resin |
| Example | A2 | PERMARIN UA150 | −70 | 90 | Sanyo Chemical Industries, Ltd. | Urethane resin |
| Comparative Example | A3 | SUPERFLEX 420 | −10 | 130 | DKS Co. Ltd. | Urethane resin |
| Comparative Example | A4 | SUPERFLEX 130 | 101 | 250 | DKS Co. Ltd. | Urethane resin |
| Example | A5 | VYLONAL MD1985 | −20 | 151 | Toyobo Co., Ltd. | Polyester |
| Example | A6 | SAIVINOL UC-1818 | −62 | 180 | Saiden Chemical Industry Co., Ltd. | Acrylic |
| Comparative Example | A7 | VYLONAL MD1335 | 4 | 223 | Toyobo Co., Ltd. | Polyester |
| Comparative Example | A8 | PESRESIN A684G | 50 | 270 | Takamatsu Oil & Fat Co., Ltd. | Polyester |

(2) Electrically Conductive Pigments (B)

Commercially available fine particles (reagents) shown in Table 2 were used (Examples). The volume average particle diameter was measured using Multisizer 3 manufactured by Beckman Coulter, Inc. (a precise particle size distribution measuring apparatus in accordance with the Coulter principle). The electrical resistivity was measured by fashioning each type of fine particles into a sintered sheet with a length of 80 mm, a width of 50 mm, and a thickness of 2 to 4 mm and using the four-terminal four-probe method and the constant current application system at 25° C. in accordance with JIS K7194, using a resistivity meter Loresta EP (MCP-T360 type) and ESP probes (the diameter of the flat head portion of the terminal: 2 mm) manufactured by Mitsubishi Chemical Analytech Co., Ltd.

TABLE 2

|  | Electrically conductive pigments B | Type |
|---|---|---|
| Example | B1 | TiB |
| Example | B2 | ZrB |
| Example | B3 | MoB |
| Example | B4 | LaB |
| Example | B5 | VC |
| Example | B6 | TiC |
| Example | B7 | TiN |
| Example | B8 | NiSi |
| Example | B9 | SUS |
| Example | B10 | ZrB + VC (volume ratio: 1:1) |
| Example | B11 | ZrB + TiC (volume ratio: 1:1) |
| Example | B12 | VC + TiN (volume ratio: 1:1) |

TiB: TiB$_2$ fine particles (TIl11PB produced by Kojundo Chemical Lab. Co., Ltd.; volume average diameter: 2.9 μm; electrical resistivity: 30×10$^{-6}$ Ωcm)

ZrB: ZrB$_2$ fine particles (produced by Wako Pure Chemical Industries, Ltd.; volume average diameter: 2.2 μm; electrical resistivity: 70×10$^{-6}$ Ωcm)

MoB: Mo$_2$B fine particles (dimolybdenum boride produced by Mitsuwa Chemicals Co., Ltd.; volume average diameter: 5.2 μm; electrical resistivity: 30×10$^{-6}$ Ωcm)

LaB: LaB$_6$ fine particles (lanthanum hexaboride produced by Soekawa Rikagaku K.K.; volume average diameter: 2.8 μm; electrical resistivity: 20×10$^{-6}$ Ωcm)

VC: VC fine particles (produced by Wako Pure Chemical Industries, Ltd.; volume average diameter: 2.3 μm; electrical resistivity: 140×10$^{-6}$ Ωcm)

TiC: TiC fine particles (produced by Wako Pure Chemical Industries, Ltd.; volume average diameter: 3.2 μm; electrical resistivity: 180×10$^{-6}$ Ωcm)

TiN: TiN fine particles (produced by Wako Pure Chemical Industries, Ltd.; volume average diameter: 1.6 μm; electrical resistivity: 20×10$^{-6}$ Ωcm)

NiSi: Ni$_2$Si fine particles (NII11PB produced by Kojundo Chemical Lab. Co., Ltd. was added to water and suspended by stirring, minute particles still floating after a lapse of 5 minutes were filtered out, and the resulting matter was used; volume average diameter: 4.8 μm; electrical resistivity: 40×10$^{-6}$ Ωcm)

SUS: SUS304 particles (volume average diameter: 3.3 μm; electrical resistivity: 70×10$^{-6}$ Ωcm)

ZrB+VC: a mixture of the ZrB mentioned above and the VC mentioned above (volume ratio: 1:1)

ZrB+TiC: a mixture of the ZrB mentioned above and the TiC mentioned above (volume ratio: 1:1)

VC+TiN: a mixture of the VC mentioned above and the TiN mentioned above (volume ratio: 1:1)

(3) Anti-Corrosion Pigments (C)

Commercially available reagents or industrial products, or mixtures in which these were blended were used as shown in Table 3 and Table 4 (Examples).

TABLE 3

| | Anti-corrosion pigments C | Type |
|---|---|---|
| Example | C1 | Magnesium pyrophosphate |
| Example | C2 | Calcium silicate |
| Example | C3 | Magnesium hydrogen phosphate |
| Example | C4 | Magnesium pyrophosphate + calcium silicate 2:1 mixture |
| Example | C5 | Tricalcium phosphate + vanadium pentoxide 2:1 mixture |
| Example | C6 | 1:2 Mixture of C1 and D1 |
| Example | C7 | 1:1 Mixture of C3 and D2 |
| Example | C8 | 1:1:1 Mixture of C1, D3, and D4 |
| Example | C9 | 1:2 Mixture of C2 and D4 |
| Example | C10 | 1:1:1 Mixture of C3, D1, and D5 |

TABLE 4

| | Metal oxide fine particles of C | Type | Particle diameter | Note |
|---|---|---|---|---|
| Example | C11 | NIPSIL E-200A, Tosoh Silica Corporation | 1.7 μm | Si oxide |
| Example | C12 | NIPGEL AZ-204, Tosoh Silica Corporation | 3.7 μm | Si oxide |
| Example | C13 | CR-50-2, Ishihara Sangyo Kaisha, Ltd. | 0.25 μm | Ti oxide |
| Example | C14 | SNOWTEX N, Nissan Chemical Industries, Ltd. | 10 to 20 nm | Si oxide |
| Example | C15 | TTO-51(A), Ishihara Sangyo Kaisha, Ltd. | 10 to 30 nm | Ti oxide |

(4) Particles (D)

Commercially available industrial products shown in Table 5 were used (Examples).

TABLE 5

| | Particles D other than B or C | Type | HM at 40° C. | Note |
|---|---|---|---|---|
| Example | D1 | CHEMIPEARL W700, Mitsui Chemicals, Inc. | 310 | Polyolefin wax |
| Example | D2 | CHEMIPEARL WP100, Mitsui Chemicals, Inc. | 362 | Polyolefin wax |
| Example | D3 | GANZPEARL GM0401, Aica Kogyo Co. Ltd. | 723 | Acrylic resin particles |
| Example | D4 | KTL-8N, Kitamura Limited | 300 | Fluorine resin particles |
| Example | D5 | TAFTIC ASF-7, Toyobo Co., Ltd. | 620 | Polyacrylonitrile resin |

Next, the resin (A), the electrically conductive pigments (B), the anti-corrosion pigments (C), and the particles (D) mentioned above and distilled water were used to prepare water-based coating compositions with various blending ratios.

The electrically conductive pigments (B), the anti-corrosion pigments (C), and the particles (D) were blended at a desired volume ratio to the total amount of the resin (A), the electrically conductive pigments (B), the anti-corrosion pigments (C), and the particles (D) contained in the nonvolatile content of the water-based coating composition. The concentration of the nonvolatile content of the water-based coating composition was adjusted while the amount of water added was changed, as appropriate, in order to obtain a target amount of the coating film attached and good coatability. Here, the "nonvolatile content" refers to the components that remain after the water or organic solvent blended as the solvent in the coating material or the composition is volatilized.

Table 6 shows the composition and the amounts (volume fraction, %) of the components contained in the coating film (α) produced using the constituent components of the coating film mentioned above.

TABLE 6-1

| | Coating film α | Organic resin A | (fraction) | Particles P Electrically conductive pigments B | (fraction) | Anti-corrosion pigments, Metal oxide fine particles C | (fraction) | Particles D other than B or C | (fraction) | HM distribution at −20° C. | HM distribution at 40° C. |
|---|---|---|---|---|---|---|---|---|---|---|---|
| Example | α1 | A1 | 70 | 30 | B1 | 10 | C1 | 20 | none | 0 | 3 | 2 |
| Example | α2 | A2 | 69 | 31 | B1 | 10 | C1 | 20 | D1 | 1 | 3 | 3 |
| Comparative Example | α3 | A3 | 65 | 35 | B1 | 10 | C1 | 20 | D1 | 5 | 1 | 2 |
| Comparative Example | α4 | A4 | 60 | 40 | B1 | 10 | C1 | 20 | D1 | 10 | 1 | 4 |
| Example | α5 | A5 | 68 | 32 | B1 | 10 | C1 | 20 | D1 | 2 | 2 | 3 |
| Example | α6 | A6 | 66 | 34 | B1 | 10 | C1 | 20 | D1 | 4 | 2 | 3 |
| Comparative Example | α7 | A7 | 66 | 34 | B1 | 10 | C1 | 20 | D1 | 4 | 1 | 4 |
| Comparative Example | α8 | A8 | 66 | 34 | B1 | 10 | C1 | 20 | D1 | 4 | 1 | 4 |
| Comparative Example | α9 | A1 | 93 | 7 | B1 | 2 | C1 | 5 | none | 0 | 4 | 1 |
| Comparative Example | α10 | A2 | 92 | 8 | B1 | 2 | C1 | 5 | D1 | 1 | 4 | 1 |
| Example | α11 | A2 | 74.5 | 25.5 | B1 | 1.5 | C1 | 20 | D1 | 4 | 3 | 2 |
| Example | α12 | A2 | 73.5 | 26.5 | B2 | 2.5 | C1 | 20 | D1 | 4 | 3 | 2 |
| Example | α13 | A2 | 71 | 29 | B3 | 5 | C1 | 20 | D1 | 4 | 3 | 2 |
| Example | α14 | A2 | 66 | 34 | B4 | 10 | C1 | 20 | D1 | 4 | 3 | 3 |
| Example | α15 | A2 | 61 | 39 | B5 | 15 | C1 | 20 | D1 | 4 | 3 | 3 |
| Example | α16 | A2 | 74 | 26 | B6 | 2 | C1 | 20 | D1 | 4 | 3 | 2 |
| Example | α17 | A2 | 72 | 28 | B7 | 4 | C1 | 20 | D1 | 4 | 3 | 2 |
| Example | α18 | A2 | 64 | 36 | B8 | 12 | C1 | 20 | D1 | 4 | 3 | 3 |
| Example | α19 | A2 | 51 | 49 | B9 | 25 | C1 | 20 | D1 | 4 | 3 | 3 |
| Example | α20 | A2 | 66 | 34 | B10 | 10 | C1 | 20 | D1 | 4 | 3 | 3 |
| Example | α21 | A2 | 66 | 34 | B11 | 10 | C1 | 20 | D1 | 4 | 3 | 3 |
| Example | α22 | A2 | 66 | 34 | B12 | 10 | C1 | 20 | D1 | 4 | 3 | 3 |
| Comparative Example | α23 | A2 | 82 | 18 | B1 | 10 | C1 | 5 | D1 | 3 | 4 | 1 |
| Example | α24 | A2 | 77 | 23 | B1 | 10 | C2 | 10 | D1 | 3 | 4 | 2 |
| Example | α25 | A2 | 62 | 38 | B1 | 10 | C3 | 25 | D1 | 3 | 3 | 3 |
| Example | α26 | A2 | 57 | 43 | B1 | 10 | C4 | 30 | D1 | 3 | 3 | 3 |
| Example | α27 | A2 | 57 | 43 | B1 | 10 | C5 | 30 | D1 | 3 | 3 | 3 |
| Example | α28 | A2 | 57 | 43 | B1 | 10 | C6 | 30 | D1 | 3 | 3 | 3 |
| Example | α29 | A2 | 57 | 43 | B1 | 10 | C7 | 30 | D1 | 3 | 3 | 3 |
| Example | α30 | A2 | 57 | 43 | B1 | 10 | C8 | 30 | D1 | 3 | 3 | 3 |
| Example | α31 | A2 | 57 | 43 | B1 | 10 | C9 | 30 | D1 | 3 | 3 | 3 |
| Example | α32 | A2 | 47 | 53 | B1 | 10 | C10 | 40 | D1 | 3 | 3 | 3 |
| Example | α33 | A2 | 65 | 35 | B1 | 10 | C1 | 20 | D1 | 5 | 3 | 3 |
| Example | α34 | A2 | 60 | 40 | B1 | 10 | C1 | 20 | D2 | 10 | 3 | 3 |
| Example | α35 | A2 | 50 | 50 | B1 | 10 | C1 | 20 | D3 | 20 | 3 | 3 |
| Example | α36 | A2 | 40 | 60 | B1 | 10 | C1 | 20 | D4 | 30 | 2 | 3 |
| Comparative Example | α37 | A2 | 35 | 65 | B1 | 10 | C1 | 20 | D5 | 35 | 1 | 4 |

TABLE 6-1

| | Coating film α | Organic resin A | (fraction) | Electrically conductive pigments B | (fraction) | Anti-corrosion pigments, Metal oxide fine particles C | (fraction) | Particles D other than B or C | (fraction) | HM distribution at −20° C. | HM distribution at 40° C. |
|---|---|---|---|---|---|---|---|---|---|---|---|
| Example | α1 | A1 | 70 | B1 | 10 | C1 | 20 | none | 0 | 3 | 2 |
| Example | α2 | A2 | 69 | B1 | 10 | C1 | 20 | D1 | 1 | 3 | 3 |
| Comparative Example | α3 | A3 | 65 | B1 | 10 | C1 | 20 | D1 | 5 | 1 | 2 |
| Comparative Example | α4 | A4 | 60 | B1 | 10 | C1 | 20 | D1 | 10 | 1 | 4 |
| Example | α5 | A5 | 68 | B1 | 10 | C1 | 20 | D1 | 2 | 2 | 3 |
| Example | α6 | A6 | 66 | B1 | 10 | C1 | 20 | D1 | 4 | 2 | 3 |
| Comparative Example | α7 | A7 | 66 | B1 | 10 | C1 | 20 | D1 | 4 | 1 | 4 |
| Comparative Example | α8 | A8 | 66 | B1 | 10 | C1 | 20 | D1 | 4 | 1 | 4 |
| Comparative Example | α9 | A1 | 93 | B1 | 2 | C1 | 5 | none | 0 | 4 | 1 |
| Comparative Example | α10 | A2 | 92 | B1 | 2 | C1 | 5 | D1 | 1 | 4 | 1 |
| Example | α11 | A2 | 74.5 | B1 | 1.5 | C1 | 20 | D1 | 4 | 3 | 2 |
| Example | α12 | A2 | 73.5 | B2 | 2.5 | C1 | 20 | D1 | 4 | 3 | 2 |
| Example | α13 | A2 | 71 | B3 | 5 | C1 | 20 | D1 | 4 | 3 | 2 |
| Example | α14 | A2 | 66 | B4 | 10 | C1 | 20 | D1 | 4 | 3 | 3 |
| Example | α15 | A2 | 61 | B5 | 15 | C1 | 20 | D1 | 4 | 3 | 3 |
| Example | α16 | A2 | 74 | B6 | 2 | C1 | 20 | D1 | 4 | 3 | 2 |
| Example | α17 | A2 | 72 | B7 | 4 | C1 | 20 | D1 | 4 | 3 | 2 |
| Example | α18 | A2 | 64 | B8 | 12 | C1 | 20 | D1 | 4 | 3 | 3 |
| Example | α19 | A2 | 51 | B9 | 25 | C1 | 20 | D1 | 4 | 3 | 3 |
| Example | α20 | A2 | 66 | B10 | 10 | C1 | 20 | D1 | 4 | 3 | 3 |
| Example | α21 | A2 | 66 | B11 | 10 | C1 | 20 | D1 | 4 | 3 | 3 |
| Example | α22 | A2 | 66 | B12 | 10 | C1 | 20 | D1 | 4 | 3 | 3 |
| Comparative Example | α23 | A2 | 82 | B1 | 10 | C1 | 5 | D1 | 3 | 4 | 1 |
| Example | α24 | A2 | 77 | B1 | 10 | C2 | 10 | D1 | 3 | 4 | 2 |
| Example | α25 | A2 | 62 | B1 | 10 | C3 | 25 | D1 | 3 | 3 | 3 |
| Example | α26 | A2 | 57 | B1 | 10 | C4 | 30 | D1 | 3 | 3 | 3 |
| Example | α27 | A2 | 57 | B1 | 10 | C5 | 30 | D1 | 3 | 3 | 3 |
| Example | α28 | A2 | 57 | B1 | 10 | C6 | 30 | D1 | 3 | 3 | 3 |
| Example | α29 | A2 | 57 | B1 | 10 | C7 | 30 | D1 | 3 | 3 | 3 |
| Example | α30 | A2 | 57 | B1 | 10 | C8 | 30 | D1 | 3 | 3 | 3 |
| Example | α31 | A2 | 57 | B1 | 10 | C9 | 30 | D1 | 3 | 3 | 3 |
| Example | α32 | A2 | 47 | B1 | 10 | C10 | 40 | D1 | 3 | 3 | 3 |
| Example | α34 | A2 | 60 | B1 | 10 | C1 | 20 | D2 | 10 | 3 | 3 |
| Example | α35 | A2 | 50 | B1 | 10 | C1 | 20 | D3 | 20 | 3 | 3 |
| Example | α36 | A2 | 40 | B1 | 10 | C1 | 20 | D4 | 30 | 2 | 3 |
| Comparative Example | α37 | A2 | 35 | B1 | 10 | C1 | 20 | D5 | 35 | 1 | 4 |

The water-based coating composition mentioned above was prepared, each component was uniformity dispersed, then the resulting matter was applied using a roll coater to the metal sheet for coating or the metal sheet provided with an underlayer treatment covering film mentioned above, the test piece was dried in a hot-air oven at a maximum heating temperature of the metal surface of 200° C., and water cooling and air drying were performed. Table 7 shows the coating film thickness (unit: μm) after film production. The coating film thickness was calculated by dividing the mass difference between before and after the peeling of the coating film after coating by the specific gravity of the coating film. The specific gravity of the coating film was calculated from the amounts of the constituent components of the coating film blended and the known specific gravity of each component.

Table 6 (Table 6-1 and Table 6-2) shows the HM distribution at −20° C. and the HM distribution at 40° C. of the surface of the coating film (α) on the surface of the coated metal sheet. Each of the distribution states is described as below.

(1) HM distribution at −20° C.
State 1: there were 0 to 19 measurement points at which the Martens micro-hardness HM at −20° C. was 10 to 200 mg/mm$^2$, out of 100 random measurement points
State 2: there were 20 to 39 measurement points at which HM was 10 to 200 mg/mm$^2$
State 3: there were 40 to 59 measurement points at which HM was 10 to 200 mg/mm$^2$
State 4: there were 60 or more measurement points at which HM was 10 to 200 mg/mm$^2$ (2) HM distribution at 40° C.
State 1: there were 0 to 4 measurement points at which the Martens micro-hardness HM at 40° C. was 200 to 200,000 mg/mm$^2$, out of 100 random measurement points
State 2: there were 5 to 9 measurement points at which HM was 200 to 200,000 mg/mm$^2$ State 3: there were 10 to 19 measurement points at which HM was 200 to 200,000 mg/mm$^2$ State 4: there were 20 or more measurement points at which HM was 200 to 200,000 mg/mm$^2$ 4. Performance Evaluation Using the coated metal sheets produced by the method of 3. mentioned above, evaluation was performed for weldability, corrosion resistance, chipping resistance, after-chipping corrosion resistance, and sticking resistance. Each test and the evaluation method are described below.

(1) Weldability

Using CF type Cr—Cu electrodes having a tip with a diameter of 5 mm and a curvature radius of 40 mm, a consecutive spot welding test was performed at an applied pressure of 1.96 kN, a welding current of 8 kA, and an energization time of 12 cycles/50 Hz, and the number of welds at the time immediately before the nugget diameter became less than $3\sqrt{t}$ (t being the sheet thickness) was found. The superiority or inferiority of spot weldability was evaluated using the following evaluation points.

4: the number of welds was 1000 or more

3: not less than 200 and less than 1000

2: less than 200

1: no nugget was generated and no spot was able to be welded (2) Corrosion Resistance A rectangular test piece with a size of 150×70 mm was cut out from the coated metal sheet produced by the method of 3. mentioned above, and an end portion was sealed with a resin; thus, a test piece of the corrosion resistance of the flat surface portion was formed.

These test pieces were subjected to a cycle corrosion test in which a total of 8 hours consisting of 2 hours of salt water spraying, 4 hours of drying, and 2 hours of moistening was taken as one cycle. The conditions of the salt water spraying were in accordance with JIS-Z2371. The drying conditions were set such that the temperature was 60° C. and the humidity was 30% (RH) or less, and the moistening conditions were set such that the temperature was 50° C. and the humidity was 95% (RH) or more. Red rust occurrence conditions were investigated, and the superiority or inferiority of the corrosion resistance of the processed portion was evaluated using the following evaluation points.

4: red rust did not occur with 450 cycles

3: red rust did not occur with 300 cycles

2: red rust did not occur with 150 cycles

1: red rust occurred with 150 cycles (3) Chipping Resistance

A rectangular test piece with a size of 150×70 mm was cut out from the coated metal sheet produced by the method of 3. mentioned above, and was used as a test piece of chipping resistance. The test piece was subjected to electrodeposition coating (film thickness: 15 µm), intermediate coating (film thickness: 30 µm), and topcoat (film thickness: 30 µm). 100 crushed stones (basalt; particle diameter: 5 to 7.5 mm) accelerated by air pressure to a speed of 30 to 60 km/h in the interior of a room at a temperature of −15° C. were ejected and made to collide with the coated steel sheet mentioned above, with the flat surface of the test sheet inclined by 15 degrees with respect to the direction in which the crushed stones came flying. A 20×20 mm area around the center of the collision of the crushed stone was observed, and the superiority or inferiority of the corrosion resistance of the chip portion was evaluated using the following evaluation points.

4: the underlying iron of the plated steel sheet was not exposed

3: one place of the underlying iron of the plated steel sheet was exposed with a size of 100 µm or more as the average of the long diameter and the short diameter 2: 2 to 4 places of the underlying iron of the plated steel sheet were exposed with a size of 100 µm or more as the average of the long diameter and the short diameter 1: 5 places or more of the underlying iron of the plated steel sheet were exposed with a size of 100 µm or more as the average of the long diameter and the short diameter (4) After-Chipping Corrosion Resistance The coated metal sheet flawed by the method of (4) mentioned above was used as a test piece of after-chipping corrosion resistance.

These test pieces were subjected to a cycle corrosion test in which a total of 8 hours consisting of 2 hours of salt water spraying, 4 hours of drying, and 2 hours of moistening was taken as one cycle. The conditions of the salt water spraying were in accordance with JIS-Z2371. The drying conditions were set such that the temperature was 60° C. and the humidity was 30% (RH) or less, and the moistening conditions were set such that the temperature was 50° C. and the humidity was 95% (RH) or more. Red rust occurrence conditions were investigated, and the superiority or inferiority of the corrosion resistance of the chip portion was evaluated using the following evaluation points.

4: red rust in which rust liquid was visually identified did not occur with 60 cycles 3: red rust in which rust liquid was visually identified occurred with 30 to 59 cycles 2: red rust in which rust liquid was visually identified occurred with 13 to 29 cycles 1: red rust in which rust liquid was visually identified occurred with 12 cycles (5) Sticking Resistance The front surface and the opposite surface, the back surface, of the produced coated metal sheet were brought into surface contact under pressure, and sticking resistance was evaluated.

As the test method, test pieces cut to 50 mm×50 mm were superimposed such that the front surface and the back surface were in surface contact with each other, hot pressing at 40° C. and 100 kg/cm$^2$ for 24 hours was performed, and then the degree of sticking (adhesion) of coating films was evaluated by the following criteria.

3: there was little sticking of coating films

2: coating films were a little stuck together, but were loose enough to easily peel off with the hand 1: coating films were stuck together, and were too firm to easily peel off with the hand Table 7 (Table 7-1 and Table 7-2) shows the evaluation results.

TABLE 7-1

Results of performance evaluation

| | No. | Coating film α | Metal sheet | Underlayer treatment | Film thickness (μm) | HM distribution at −20° C. | HM distribution at 40° C. | Chipping resistance | Sticking test | Weldability | Corrosion resistance | After-chipping corrosion resistance |
|---|---|---|---|---|---|---|---|---|---|---|---|---|
| Example | 1 | α1 | GA | Not performed | 0.5 | 3 | 2 | 3 | 2 | 4 | 2 | 2 |
| Example | 2 | α2 | GA | Not performed | 1 | 3 | 3 | 4 | 3 | 4 | 2 | 3 |
| Comparative Example | 3 | α3 | GA | Not performed | 3 | 1 | 2 | 1 | 2 | 4 | 3 | 3 |
| Comparative Example | 4 | α4 | GA | Not performed | 5 | 1 | 4 | 1 | 3 | 4 | 4 | 1 |
| Example | 5 | α5 | GA | Not performed | 7 | 2 | 3 | 2 | 3 | 3 | 4 | 2 |
| Example | 6 | α6 | GA | Not performed | 8 | 2 | 3 | 2 | 3 | 2 | 4 | 2 |
| Comparative Example | 7 | α7 | GA | Not performed | 4 | 1 | 4 | 1 | 4 | 4 | 4 | 1 |
| Comparative Example | 8 | α8 | GA | Not performed | 5 | 1 | 4 | 1 | 4 | 4 | 4 | 1 |
| Comparative Example | 9 | α9 | GA | Not performed | 5 | 4 | 1 | 4 | 1 | 2 | 2 | 2 |
| Comparative Example | 10 | α10 | GA | Not performed | 5 | 4 | 1 | 4 | 1 | 2 | 2 | 2 |
| Example | 11 | α11 | EG | Not performed | 0.35 | 3 | 2 | 4 | 2 | 4 | 2 | 2 |
| Example | 12 | α12 | EG | Performed | 1.5 | 3 | 2 | 4 | 2 | 4 | 3 | 3 |
| Example | 13 | α13 | GI | Not performed | 2.5 | 3 | 2 | 4 | 2 | 4 | 3 | 4 |
| Example | 14 | α14 | GI | Performed | 5 | 3 | 3 | 4 | 3 | 4 | 4 | 4 |
| Example | 15 | α15 | SD | Not performed | 10 | 3 | 3 | 4 | 3 | 3 | 4 | 4 |
| Example | 16 | α16 | SD | Performed | 1 | 3 | 2 | 4 | 2 | 4 | 2 | 3 |
| Example | 17 | α17 | SD | Not performed | 3 | 3 | 2 | 4 | 2 | 2 | 3 | 4 |
| Example | 18 | α18 | ZL | Performed | 15 | 3 | 3 | 4 | 3 | 2 | 4 | 4 |
| Example | 19 | α19 | ZL | Not performed | 20 | 3 | 3 | 4 | 3 | 2 | 4 | 4 |
| Example | 20 | α20 | ZL | Performed | 3 | 3 | 3 | 4 | 3 | 4 | 3 | 4 |
| Example | 21 | α21 | GA | Not performed | 5 | 3 | 3 | 4 | 3 | 4 | 4 | 4 |
| Example | 22 | α22 | GA | Performed | 5 | 3 | 3 | 4 | 3 | 4 | 4 | 4 |
| Comparative Example | 23 | α23 | GA | Not performed | 3 | 4 | 1 | 4 | 1 | 4 | 2 | 2 |
| Example | 24 | α24 | GA | Not performed | 5 | 4 | 2 | 4 | 2 | 4 | 3 | 3 |
| Exampg | 25 | α25 | GA | Not performed | 7 | 3 | 3 | 4 | 3 | 3 | 4 | 4 |
| Example | 26 | α26 | GA | Not performed | 3 | 3 | 3 | 4 | 3 | 4 | 4 | 4 |
| Example | 27 | α27 | GA | Not performed | 3 | 3 | 3 | 4 | 3 | 4 | 4 | 4 |
| Example | 28 | α28 | GA | Not performed | 5 | 3 | 3 | 4 | 3 | 4 | 4 | 4 |
| Example | 29 | α29 | GA | Not performed | 7 | 3 | 3 | 4 | 3 | 3 | 4 | 4 |
| Example | 30 | α30 | GA | Not performed | 10 | 3 | 3 | 4 | 3 | 2 | 4 | 4 |
| Example | 31 | α31 | GA | Not performed | 3 | 3 | 3 | 4 | 3 | 4 | 4 | 4 |
| Example | 32 | α32 | GA | Not performed | 5 | 3 | 3 | 4 | 3 | 4 | 4 | 4 |
| Example | 34 | α34 | GA | Not performed | 10 | 3 | 3 | 4 | 2 | 2 | 4 | 4 |
| Example | 35 | α35 | GA | Not performed | 5 | 3 | 3 | 3 | 2 | 4 | 4 | 4 |
| Example | 36 | α36 | GA | Not performed | 5 | 2 | 3 | 2 | 3 | 4 | 4 | 4 |
| Example | 37 | α37 | GA | Not performed | 7 | 1 | 4 | 1 | 4 | 3 | 4 | 4 |

TABLE 7-2

Results of performance evaluation

| | No. | Coating film α | Metal sheet | Underlayer treatment | Film thickness (μm) | HM distribution at −20° C. | HM distribution at 40° C. | Chipping resistance | Sticking test | Weldability | Corrosion resistance | After-chipping corrosion resistance |
|---|---|---|---|---|---|---|---|---|---|---|---|---|
| Example | 40 | α40 | GA | Not performed | 2 | 3 | 2 | 3 | 2 | 4 | 3 | 2 |
| Example | 41 | α41 | GA | Not performed | 2 | 3 | 3 | 3 | 3 | 4 | 3 | 3 |
| Comparative Example | 42 | α42 | GA | Not performed | 2 | 1 | 2 | 1 | 2 | 4 | 3 | 1 |
| Comparative Example | 43 | α43 | GA | Not performed | 2 | 1 | 4 | 1 | 3 | 4 | 3 | 1 |
| Example | 44 | α44 | GA | Not performed | 2 | 2 | 3 | 2 | 3 | 4 | 3 | 2 |
| Example | 45 | α45 | GA | Not performed | 2 | 2 | 3 | 2 | 3 | 4 | 3 | 2 |
| Comparative Example | 46 | α46 | GA | Not performed | 2 | 1 | 4 | 1 | 4 | 4 | 3 | 1 |
| Comparative Example | 47 | α47 | GA | Not performed | 2 | 1 | 4 | 1 | 4 | 4 | 3 | 1 |
| Comparative Example | 48 | α48 | GA | Not performed | 2 | 4 | 1 | 4 | 1 | 3 | 2 | 2 |
| Example | 49 | α49 | GA | Not performed | 2 | 2 | 4 | 2 | 4 | 4 | 4 | 2 |

TABLE 7-2-continued

Results of performance evaluation

| | No. | Coating film α | Metal sheet | Underlayer treatment | Film thickness (μm) | HM distribution at −20° C. | HM distribution at 40° C. | Chipping resistance | Sticking test | Weldability | Corrosion resistance | After-chipping corrosion resistance |
|---|---|---|---|---|---|---|---|---|---|---|---|---|
| Comparative Example | 50 | α50 | GA | Not performed | 2 | 1 | 4 | 1 | 4 | 4 | 4 | 2 |
| Comparative Example | 51 | α51 | GA | Not performed | 2 | 4 | 1 | 4 | 1 | 1 | 1 | 1 |
| Comparative Example | 52 | α52 | GA | Not performed | 2 | 4 | 1 | 4 | 1 | 1 | 2 | 2 |
| Comparative Example | 53 | α53 | GA | Not performed | 2 | 4 | 1 | 4 | 1 | 1 | 2 | 2 |
| Comparative Example | 54 | α54 | GA | Not performed | 2 | 4 | 1 | 4 | 1 | 2 | 2 | 2 |
| Example | 55 | α55 | GA | Not performed | 2 | 3 | 2 | 3 | 2 | 2 | 3 | 2 |
| Example | 56 | α56 | GA | Not performed | 2 | 2 | 4 | 2 | 4 | 4 | 4 | 2 |
| Comparative Example | 57 | α57 | GA | Not performed | 2 | 1 | 4 | 1 | 4 | 4 | 4 | 1 |
| Example | 58 | α58 | GA | Not performed | 0.5 | 3 | 2 | 3 | 2 | 4 | 3 | 2 |
| Example | 59 | α59 | GA | Not performed | 0.5 | 3 | 2 | 3 | 2 | 4 | 3 | 2 |
| Example | 60 | α60 | GA | Not performed | 0.5 | 3 | 2 | 3 | 2 | 4 | 3 | 2 |
| Example | 61 | α61 | GA | Not performed | 0.5 | 3 | 2 | 3 | 2 | 4 | 3 | 2 |
| Example | 62 | α62 | GA | Not performed | 0.5 | 3 | 2 | 3 | 2 | 4 | 3 | 2 |

The invention claimed is:

1. A coated metal sheet for automobile comprising:
a metal sheet; and
a coating film (α) present on at least one surface of the metal sheet,
wherein the coating film (α) contains
an organic resin (A),
electrically conductive pigments (B), and
anti-corrosion pigments (C), and
a Martens micro-hardness HM at −20° C. of the surface of the coating film (α) is 10 to 200 mg$_f$/mm$^2$ at 20 points or more when measured at 100 random points of the surface of the coating film (α) of the coated metal sheet, and a Martens micro-hardness HM at 40° C. of the surface of the coating film (α) is 200 to 200,000 mg$_f$/mm$^2$ at 5 points or more when measured at 100 random points of the surface of the coating film (α) of the coated metal sheet,
wherein an exposure density of primary particles of particles (P) on the surface of the coating film is 100 to 2.0×10$^6$/mm$^2$, wherein the particles (P) are particles selected from the electrically conductive pigments (B) and the anti-corrosion pigments (C) and having a diameter of the primary particles of 1 μm to 10 μm,
wherein the organic resin (A) is a polyurethane resin, and
wherein a glass transition temperature Tg of the organic resin (A) is −80° C. to −20° C.

2. The coated metal sheet for automobile according to claim 1, wherein the electrically conductive pigments (B) are non-oxide ceramic particles with an electrical resistivity at 25° C. of 0.1×10$^{-6}$ to 185×10$^{-6}$ Ωcm, the electrically conductive pigments being at least one selected from a boride, a carbide, a nitride, and a silicide.

3. The coated metal sheet for automobile according to claim 1, wherein the coating film (α) contains 0.5 vol % to 65 vol % of the electrically conductive pigments (B).

4. The coated metal sheet for automobile according to claim 1, wherein the anti-corrosion pigments (C) comprise:
one or more selected from a compound capable of releasing a silicate ion, a phosphate ion, a vanadate ion, a tungstate ion, or a molybdate ion, or
particles containing a metal element selected from the group consisting of Si, Ti, Al, and Zr, or
both thereof.

5. The coated metal sheet for automobile according to claim 1, wherein the coating film (α) contains 1 vol % to 40 vol % of the anti-corrosion pigments (C).

6. The coated metal sheet for automobile according to claim 1, comprising, in the coating film, granular particles (D) with a Martens hardness at 40° C. of 200 mg$_f$/mm$^2$ to 200,000 mg$_f$/mm$^2$,
wherein the particles (P) are particles selected from the electrically conductive pigments (B), the anti-corrosion pigments (C), and the particles (D) and having the diameter of the primary particles of 1 μm to 10 μm.

7. An automobile component formed by processing and shaping the coated metal sheet for automobile according to claim 1.

8. An automobile component formed by further applying one or more of an electrodeposition coating layer, an intermediate coating layer, and a topcoat layer to the automobile component according to claim 7.

* * * * *